US011867443B2

(12) United States Patent
Benouali

(10) Patent No.: US 11,867,443 B2
(45) Date of Patent: Jan. 9, 2024

(54) THERMAL MANAGEMENT DEVICE FOR AN ELECTRIC OR HYBRID MOTOR VEHICLE

(71) Applicant: Valeo Systemes Thermiques, Le Mesnil Saint-Denis (FR)

(72) Inventor: Jugurtha Benouali, Le Mesnil Saint-Denis (FR)

(*) Notice: Subject to any disclaimer, the term of this patent is extended or adjusted under 35 U.S.C. 154(b) by 230 days.

(21) Appl. No.: 17/430,586

(22) PCT Filed: Jan. 22, 2020

(86) PCT No.: PCT/FR2020/050084
§ 371 (c)(1),
(2) Date: Aug. 12, 2021

(87) PCT Pub. No.: WO2020/165512
PCT Pub. Date: Aug. 20, 2020

(65) Prior Publication Data
US 2022/0128273 A1 Apr. 28, 2022

(30) Foreign Application Priority Data
Feb. 13, 2019 (FR) .................................. 1901420

(51) Int. Cl.
*B60H 1/00* (2006.01)
*F25B 5/04* (2006.01)
(Continued)

(52) U.S. Cl.
CPC ........... *F25B 5/04* (2013.01); *B60H 1/00278* (2013.01); *B60H 1/00885* (2013.01);
(Continued)

(58) Field of Classification Search
CPC ............ B60H 1/00278; B60H 1/00885; B60H 1/00921; B60H 2001/00307;
(Continued)

(56) References Cited

FOREIGN PATENT DOCUMENTS

| DE | 102016110957 A1 | 12/2016 |
| WO | 03/031884 A2 | 4/2003 |
| WO | 2018/185412 A1 | 10/2018 |

OTHER PUBLICATIONS

International Search Report with Written Opinion in corresponding International Application No. PCT/FR2020/050084, dated Mar. 31, 2020 (12 pages).

*Primary Examiner* — Davis D Hwu
(74) *Attorney, Agent, or Firm* — Osha Bergman Watanabe & Burton LLP

(57) ABSTRACT

The present invention concerns a thermal management device comprising an indirect air-conditioning circuit (1) for a motor vehicle, comprising: a first refrigerant loop (A) comprising, in the direction of flow of the refrigerant, a compressor (3), a two-fluid heat exchanger (5), a first expansion device (7), a first heat exchanger (9) arranged inside a first heating, ventilation and air-conditioning device (X), a second expansion device (11), a second heat exchanger (13), and a first bypass duct (30) comprising a first stop valve (33), a first inner heat exchanger (19), a second inner heat exchanger (19'), a second bypass duct (40) comprising a third expansion device (17) arranged upstream from a first cooler (15), a third bypass duct (80) comprising a first additional heat exchanger (9') arranged in a second heating, ventilation and air-conditioning device (Y), a second heat transfer fluid loop (B).

10 Claims, 14 Drawing Sheets

Figure 1:
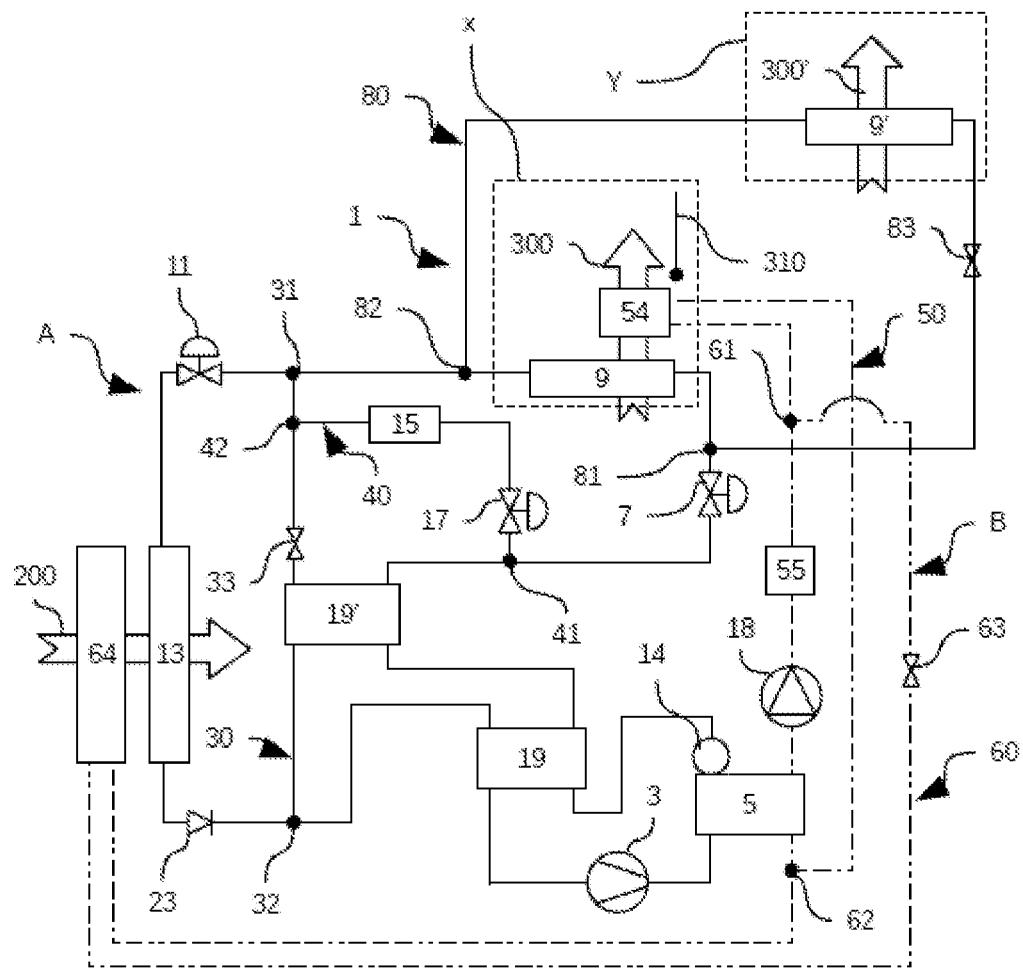

(51) Int. Cl.
*F25B 6/04* (2006.01)
*F25B 40/02* (2006.01)

(52) U.S. Cl.
CPC .......... *B60H 1/00921* (2013.01); *F25B 6/04* (2013.01); *F25B 40/02* (2013.01); *B60H 2001/00307* (2013.01); *B60H 2001/00928* (2013.01); *B60H 2001/00942* (2013.01); *B60H 2001/00949* (2013.01); *B60H 2001/00957* (2013.01); *F25B 2339/047* (2013.01); *F25B 2400/0403* (2013.01); *F25B 2400/0409* (2013.01)

(58) Field of Classification Search
CPC ........... B60H 2001/00928; B60H 2001/00942; F25B 6/04; F25B 40/02; F25B 2339/047; F25B 2400/0403
USPC ........................................................ 165/202
See application file for complete search history.

THERMAL MANAGEMENT DEVICE FOR AN ELECTRIC OR HYBRID MOTOR VEHICLE

The invention relates to the field of motor vehicles and more particularly to a thermal management device for a hybrid or electric motor vehicle.

Present-day motor vehicles increasingly comprise a thermal management device comprising an air-conditioning circuit. In general, in a "conventional" air-conditioning circuit, a refrigerant passes successively through a compressor, a first heat exchanger, referred to as a condenser, placed in contact with a flow of air external to the motor vehicle in order to release heat, an expansion device and a second heat exchanger, referred to as an evaporator, placed in contact with a flow of air internal to the motor vehicle in order to cool same.

There are also more complicated air-conditioning circuit architectures that make it possible to obtain an air-conditioning circuit that is reversible, which means to say that it can absorb heat energy from the external air at the first heat exchanger, then referred to as an evaporator/condenser, and release it into the interior of the vehicle, notably by means of a dedicated third heat exchanger.

That is possible notably by using an indirect air-conditioning circuit. What is meant here by indirect is that the air-conditioning circuit comprises two loops for the circulation of two distinct fluids (such as, for example, a refrigerant fluid and glycol-water) in order to perform the various heat exchanges.

The air-conditioning circuit thus comprises a first loop for refrigerant fluid, through which there circulates a refrigerant fluid, a second loop for heat-transfer fluid, through which there circulates a heat-transfer fluid, and a two-fluid heat exchanger arranged jointly on the first loop for refrigerant fluid and on the second loop for heat-transfer fluid, so as to allow exchanges of heat between said loops.

Such an air-conditioning circuit can be used in various modes of operation. In the context of an electric or hybrid vehicle, the thermal management of elements such as the batteries and the electronic components is performed using a secondary thermal management loop. However, such an architecture may not be sufficient to allow thermal comfort throughout the entirety of the vehicle, particularly when the vehicle interior is of a large size or when different zones of the interior are required to be at different temperatures.

One of the aims of the present invention is therefore to overcome at least some of the drawbacks of the prior art and propose an improved thermal management device that allows a refined management of the temperature of the motor vehicle interior.

The present invention therefore relates to a thermal management device comprising an indirect air-conditioning circuit for a motor vehicle, comprising:

- a first loop for refrigerant fluid in which there circulates a refrigerant fluid, said first loop for refrigerant fluid comprising, in the direction of circulation of the refrigerant fluid, a compressor, a two-fluid heat exchanger, a first expansion device, a first heat exchanger arranged within a first heating, ventilation and air-conditioning device and through which there is intended to pass a first flow of air internal to the motor vehicle, a second expansion device, a second heat exchanger through which there is intended to pass a flow of air external to the motor vehicle, and
- a first bypass pipe connecting a first connection point arranged downstream of the first heat exchanger, between said first heat exchanger and the second heat exchanger, to a second connection point arranged downstream of the second heat exchanger, between said second heat exchanger and the compressor, said first bypass pipe comprising a first shut-off valve,
- a first internal heat exchanger, allowing an exchange of heat between the high-pressure refrigerant fluid leaving the two-fluid heat exchanger and the low-pressure refrigerant fluid leaving the second heat exchanger or leaving the first bypass pipe.
- a second internal heat exchanger allowing an exchange of heat between the high-pressure refrigerant fluid leaving the first internal heat exchanger and the low-pressure refrigerant fluid circulating in the first bypass pipe,
- a second bypass pipe connecting a third connection point arranged upstream of the first expansion device, between the compressor and said first expansion device, to a fourth connection point arranged on the first bypass pipe or upstream of the first internal heat exchanger, between the second connection point and said first internal heat exchanger, said second bypass pipe comprising a third expansion device arranged upstream of a first cooler,
- a third bypass pipe, bypassing the first heat exchanger, said third bypass pipe comprising a first additional heat exchanger arranged in a second heating, ventilation and air-conditioning device,
- a second loop for heat-transfer fluid in which a heat-transfer fluid circulates, the two-fluid heat exchanger being arranged jointly, on the one hand, on the first loop for refrigerant fluid downstream of the compressor, between said compressor and the first expansion device, and, on the other hand, on the second loop for heat-transfer fluid.

According to one aspect of the invention, the third bypass pipe connects a fifth connection point, arranged downstream of the first expansion device, between said first expansion device and the first heat exchanger, to a sixth connection point, arranged downstream of the first heat exchanger, between said first heat exchanger and the first bypass pipe.

According to another aspect of the invention, the third bypass pipe comprises a shut-off valve.

According to another aspect of the invention, the third bypass pipe connects a fifth connection point, arranged upstream of the first expansion device, between the second bypass pipe and said first expansion device, to a sixth connection point, arranged downstream of the first heat exchanger, between said first heat exchanger and the first bypass pipe, said third bypass pipe comprising a fourth expansion device arranged upstream of the first additional heat exchanger.

According to another aspect of the invention, the fourth expansion device is a thermostatic expansion valve, the thermostatic sensing bulb of which is positioned at the outlet of the first additional heat exchanger.

According to another aspect of the invention, the fourth expansion device is an electronic expansion valve controlled by an electronic control unit.

According to another aspect of the invention, the second loop for heat-transfer fluid comprises:
- the two-fluid heat exchanger,
- a first heat-transfer fluid circulation pipe comprising a third heat exchanger arranged in the first heating, ventilation and air-conditioning device and intended to have passing through it a first flow of air internal to the motor vehicle, and connecting a first junction point positioned downstream of the two-fluid heat exchanger and a second junction point positioned upstream of said two-fluid heat exchanger, a second heat-transfer fluid circulation pipe comprising a fourth heat exchanger intended to have passing through it a flow of air external to the motor vehicle, and connecting the first junction point positioned downstream of the two-fluid heat exchanger and the second junction point positioned upstream of said two-fluid heat exchanger, and a pump positioned downstream or upstream of the two-fluid heat exchanger, between the first junction point and the second junction point.

According to another aspect of the invention, the second loop for heat-transfer fluid comprises a third heat-transfer fluid circulation pipe comprising a second additional heat exchanger arranged in the second heating, ventilation and air-conditioning device and connecting a third junction point arranged downstream of the first junction point, between said first junction point and the third heat exchanger, to a fourth junction point arranged downstream of the third heat exchanger, between said third heat exchanger and the second junction point.

According to another aspect of the invention, the first loop for refrigerant fluid comprises a fourth circulation pipe connecting a seventh connection point, arranged upstream of the second expansion device, between the first connection point and said second expansion device, to an eighth connection point, arranged downstream of the second heat exchanger, between said second heat exchanger and the first internal heat exchanger, said fourth circulation pipe comprising a fifth expansion device arranged upstream of a fifth heat exchanger.

According to another aspect of the invention, the first loop for refrigerant fluid comprises a fifth circulation pipe connecting a ninth connection point, arranged downstream of the two-fluid heat exchanger, between said two-fluid heat exchanger and the first internal heat exchanger, to a tenth connection point, arranged upstream of the first internal heat exchanger, between said first internal heat exchanger and the ninth connection point, said fifth circulation pipe comprising a sixth heat exchanger intended to have a flow of external air passing through it.

Figure 2:
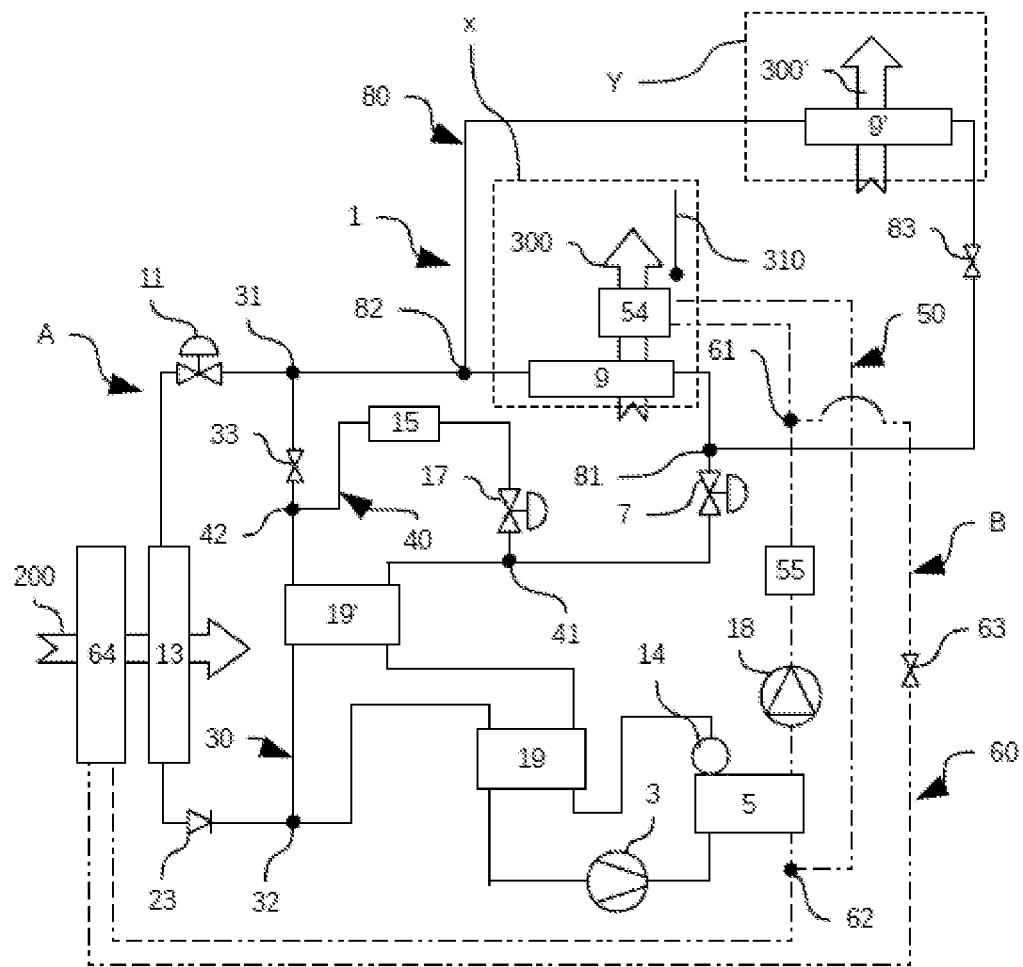

Other features and advantages of the invention will become more clearly apparent from reading the following description, which is given by way of illustrative and non-limiting example, and the appended drawings, in which:

FIG. 1 is a schematic depiction of an indirect reversible air-conditioning circuit according to a first embodiment, FIG. 2 is a schematic depiction of an indirect reversible air-conditioning circuit according to a second embodiment.

Figure 3:
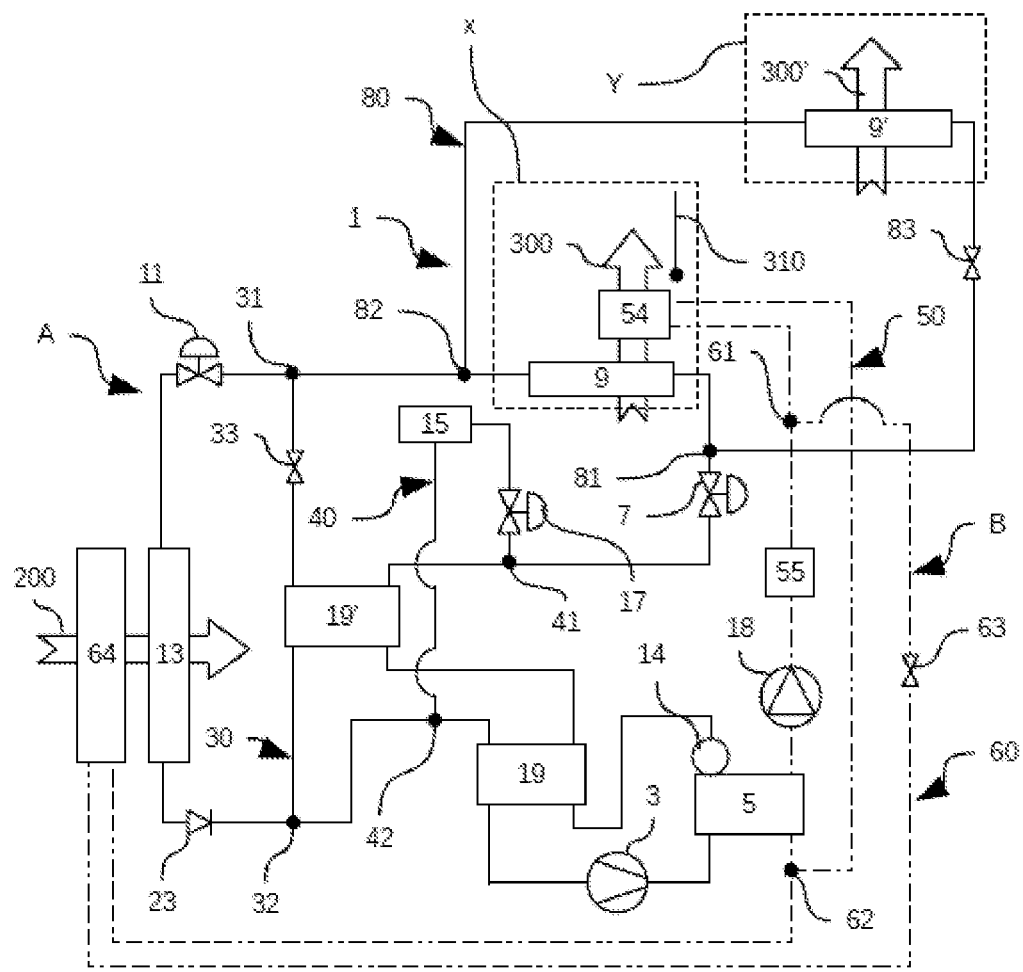
Figure 4:
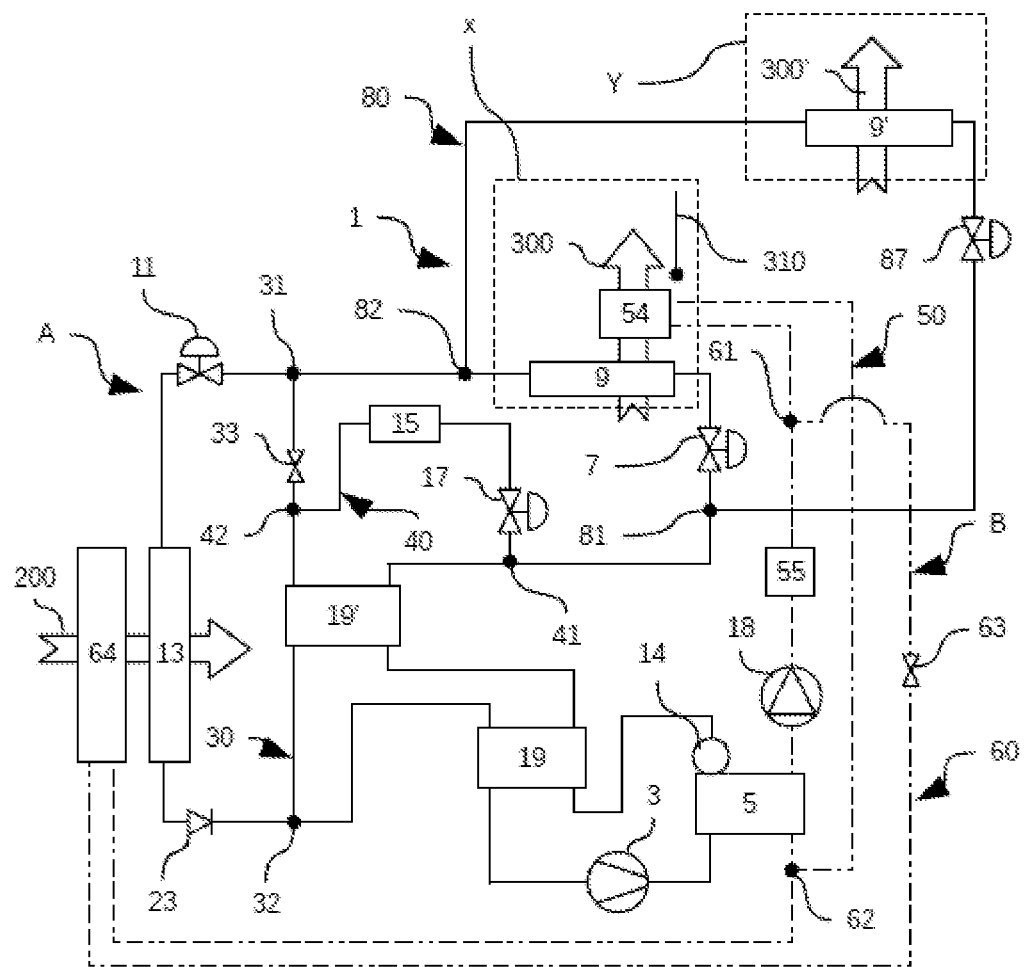
Figure 5:
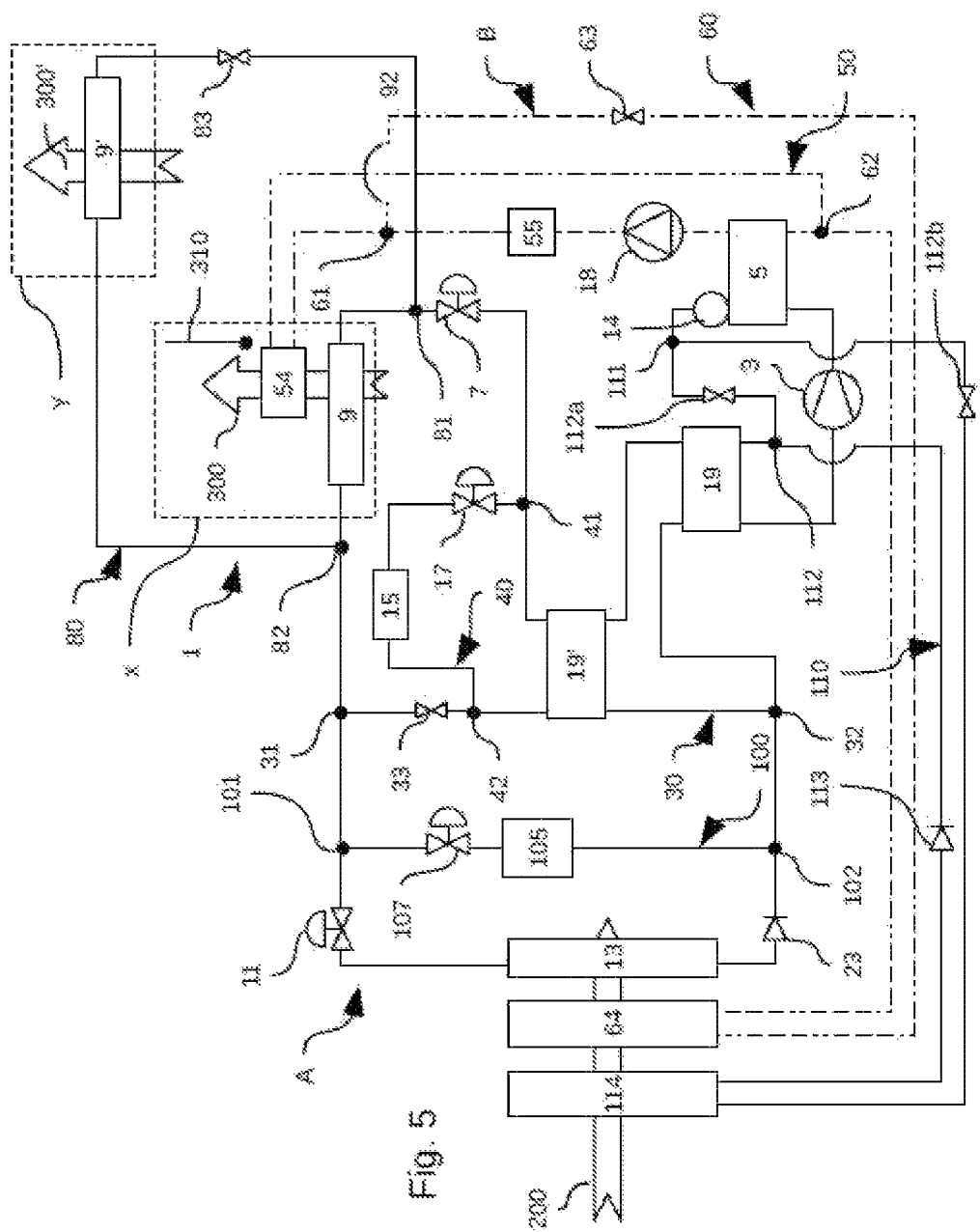
Figure 6:
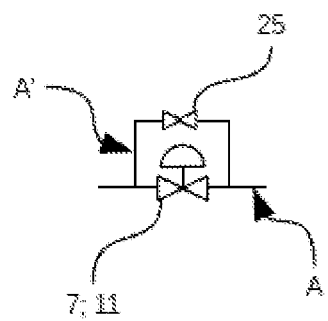
Figure 7:
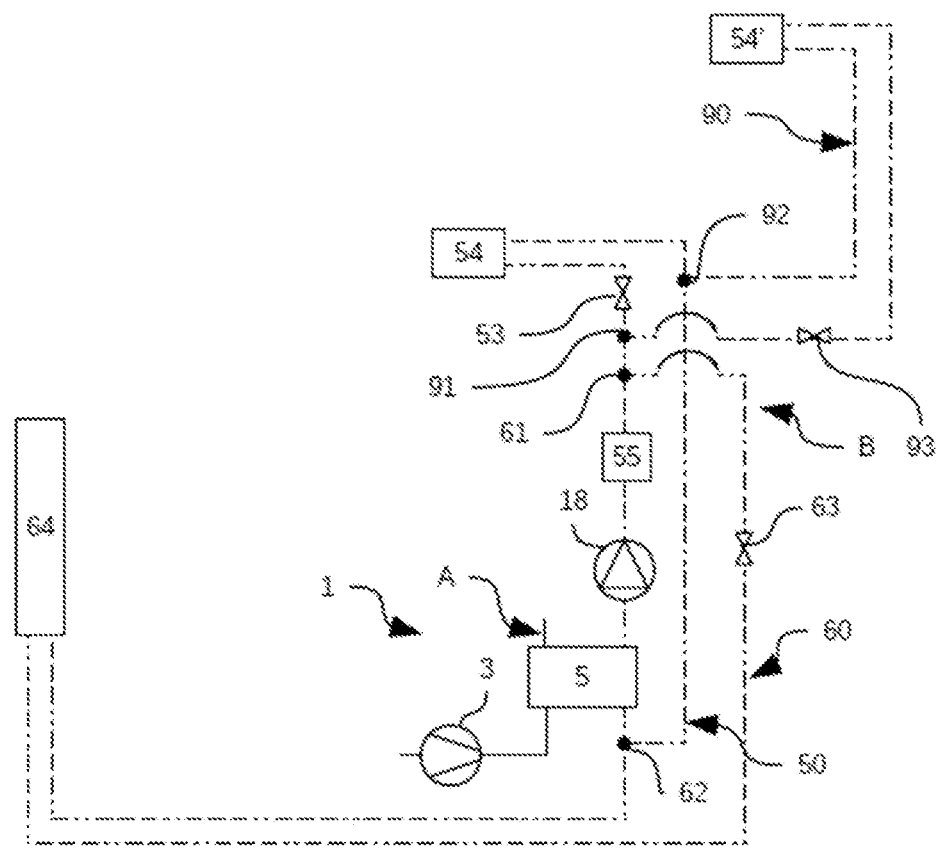
Figure 8:
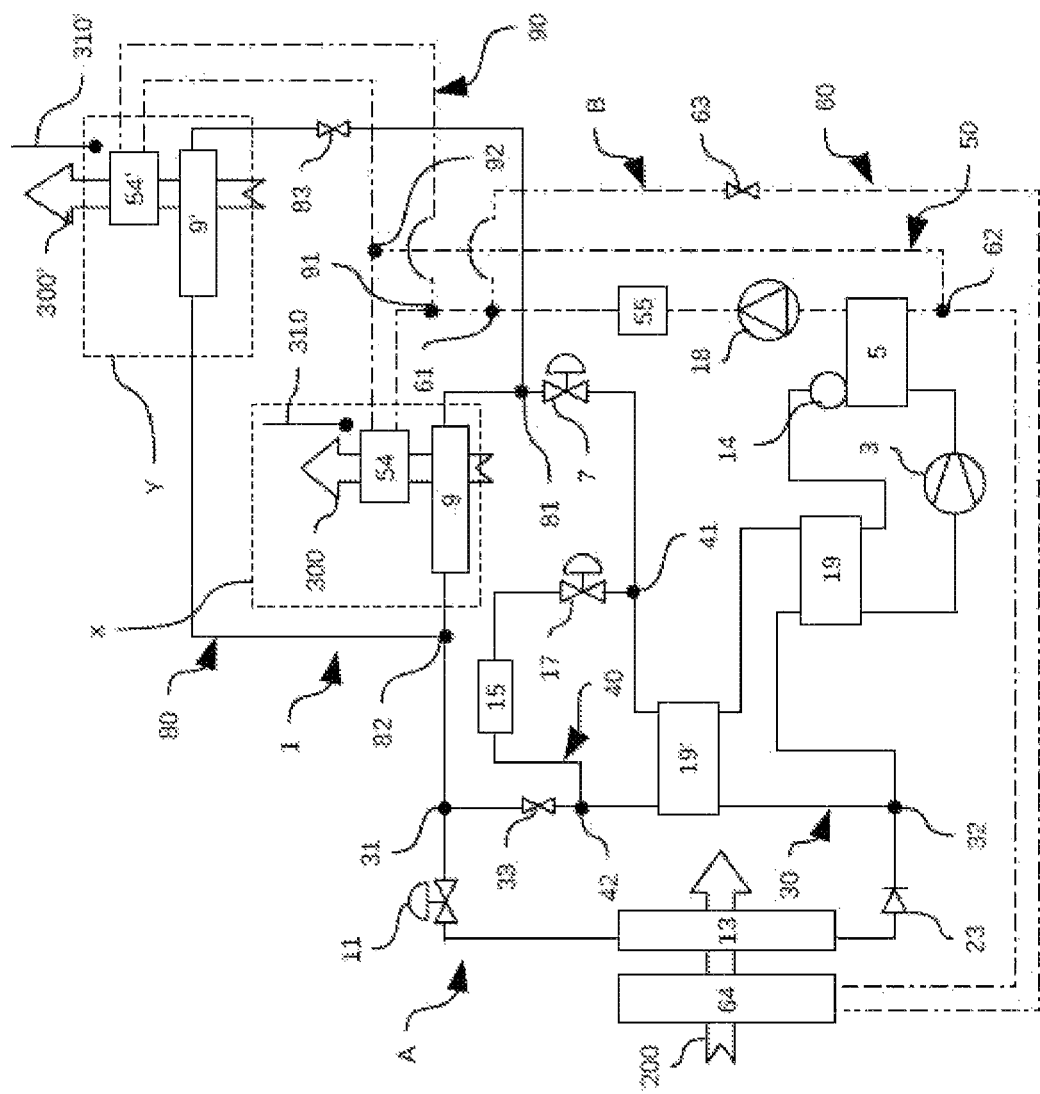
Figure 9:
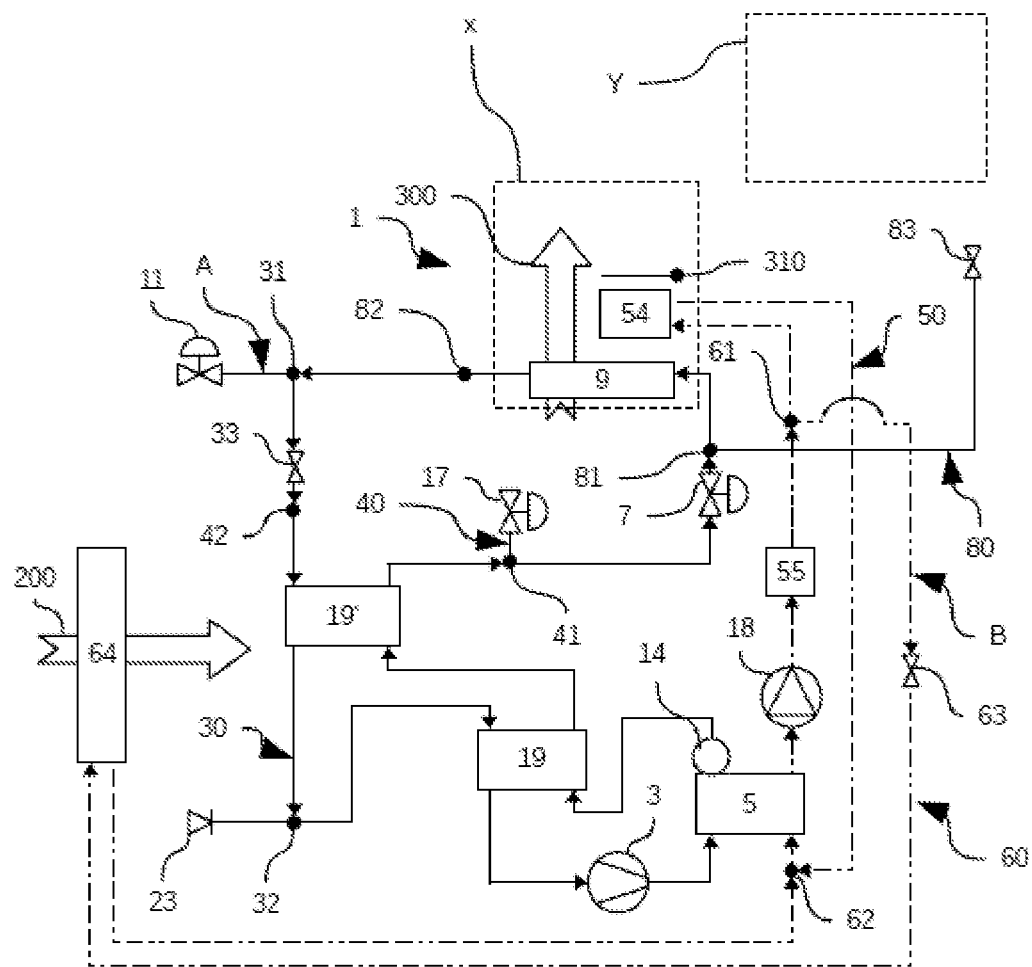
Figure 10:
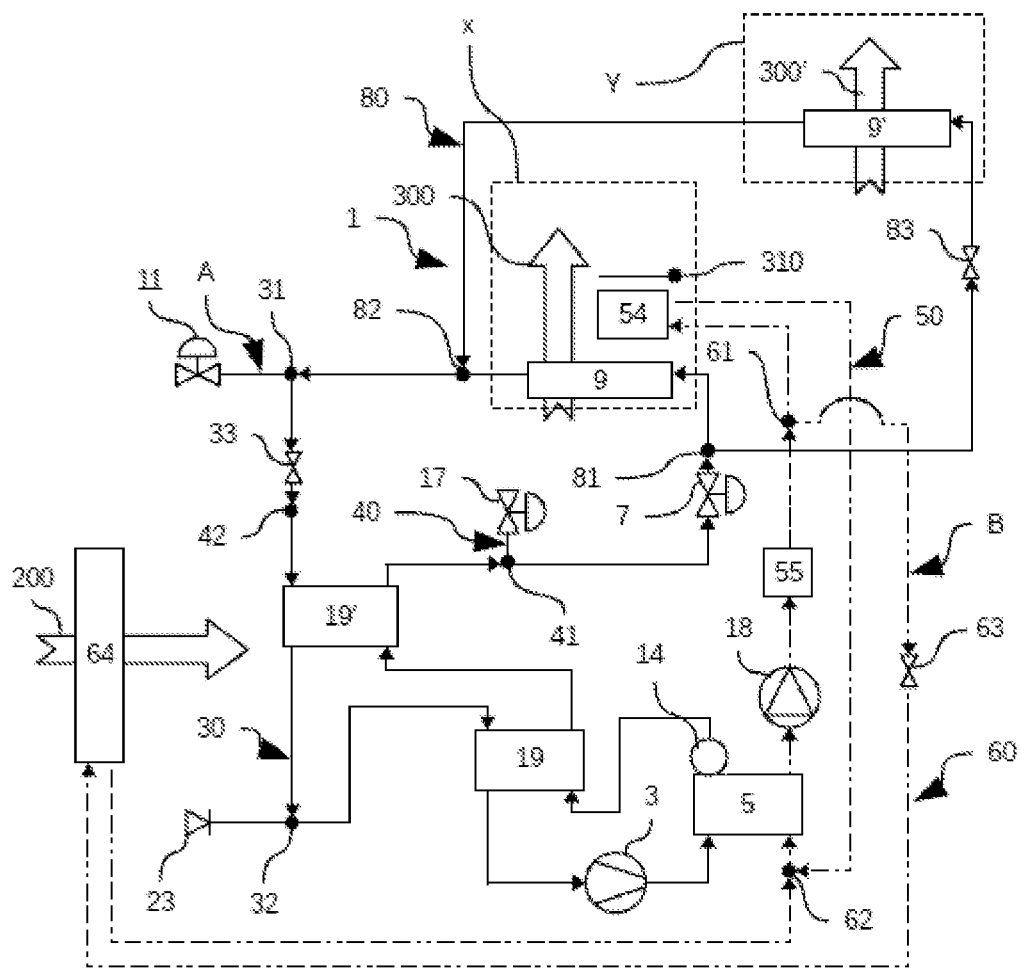
Figure 11:
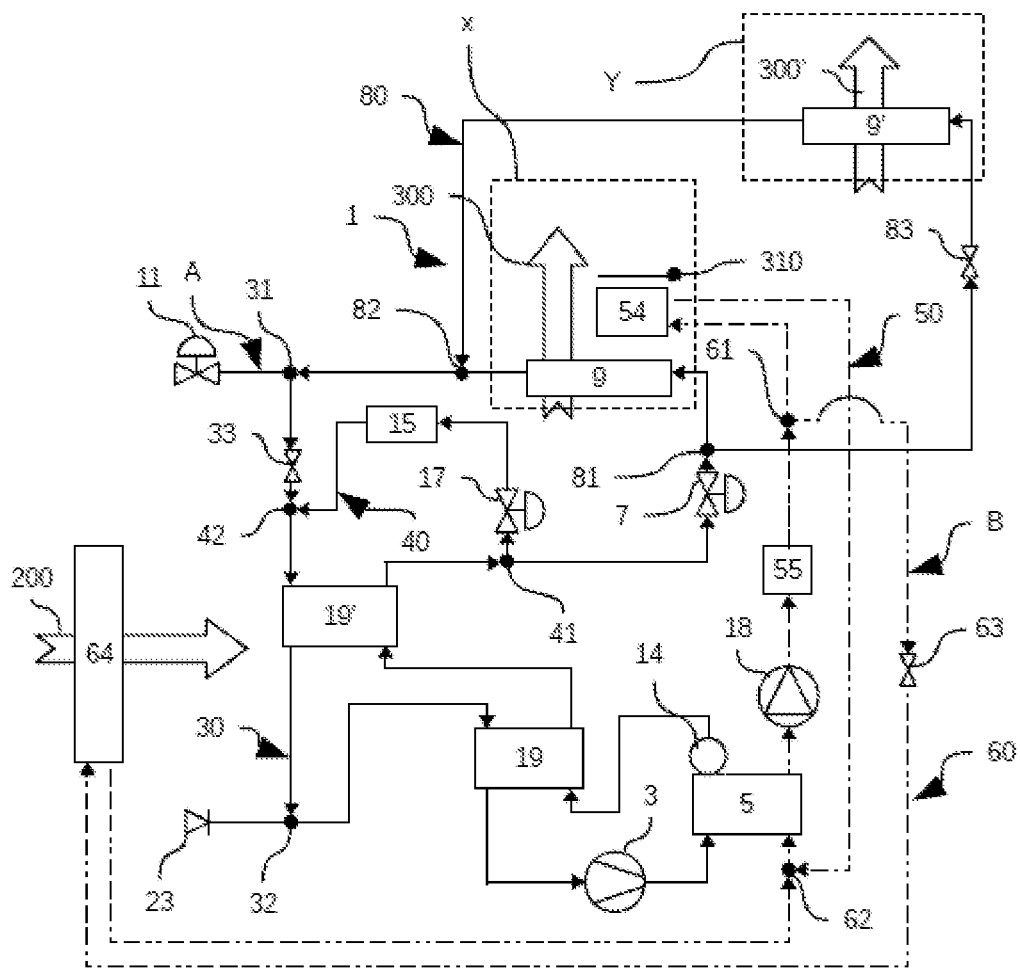
Figure 12:
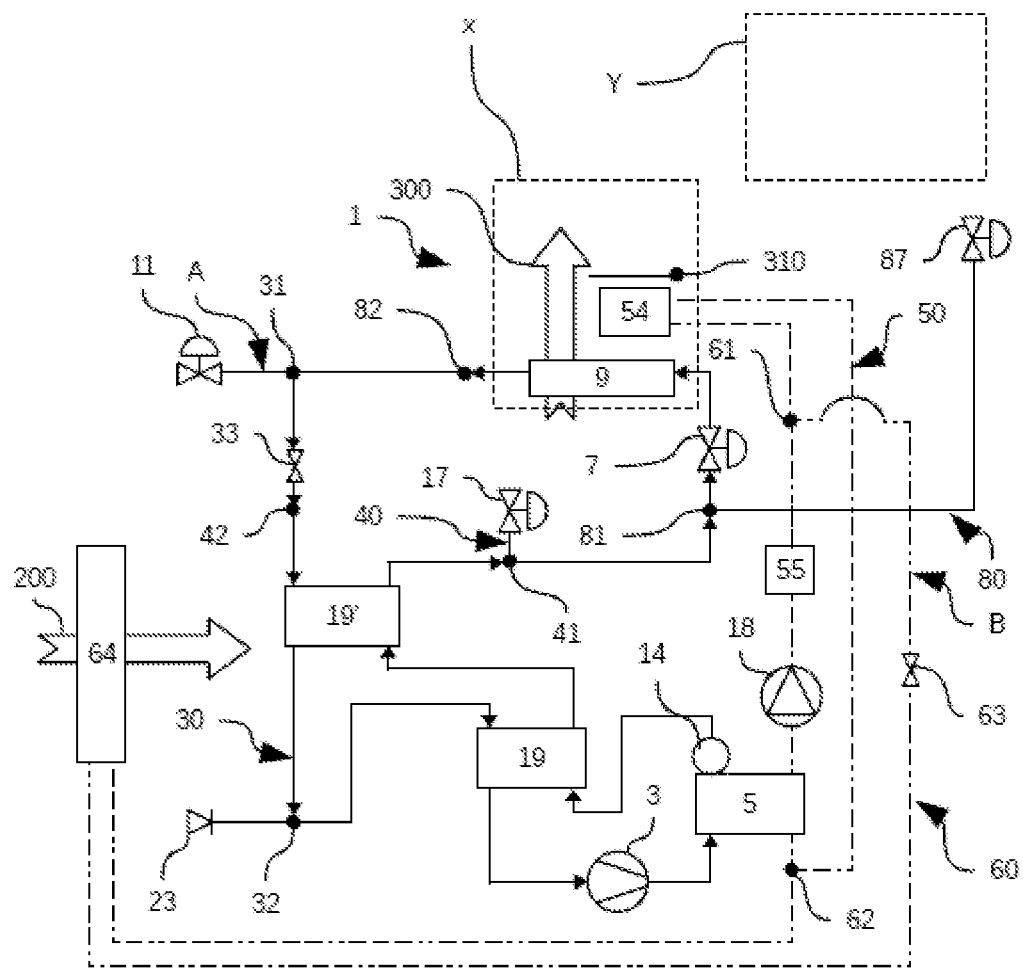
Figure 13:
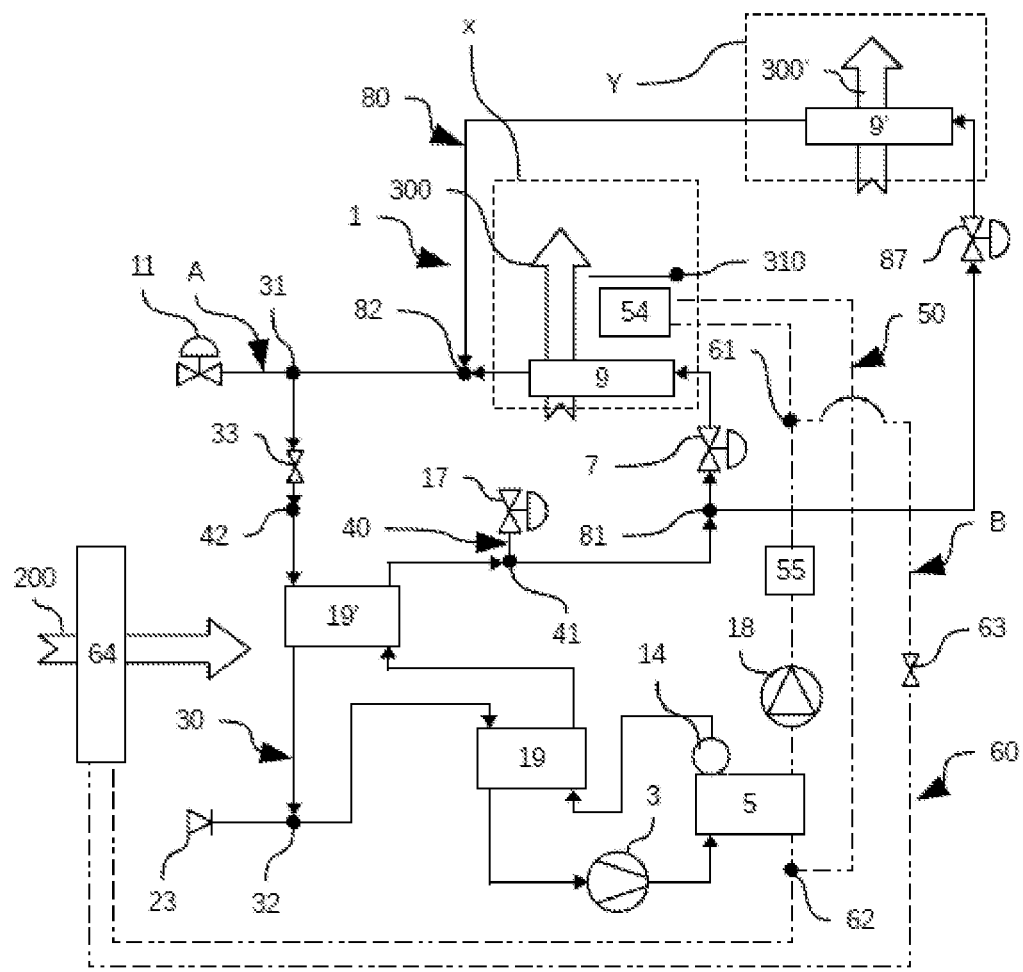
Figure 14:
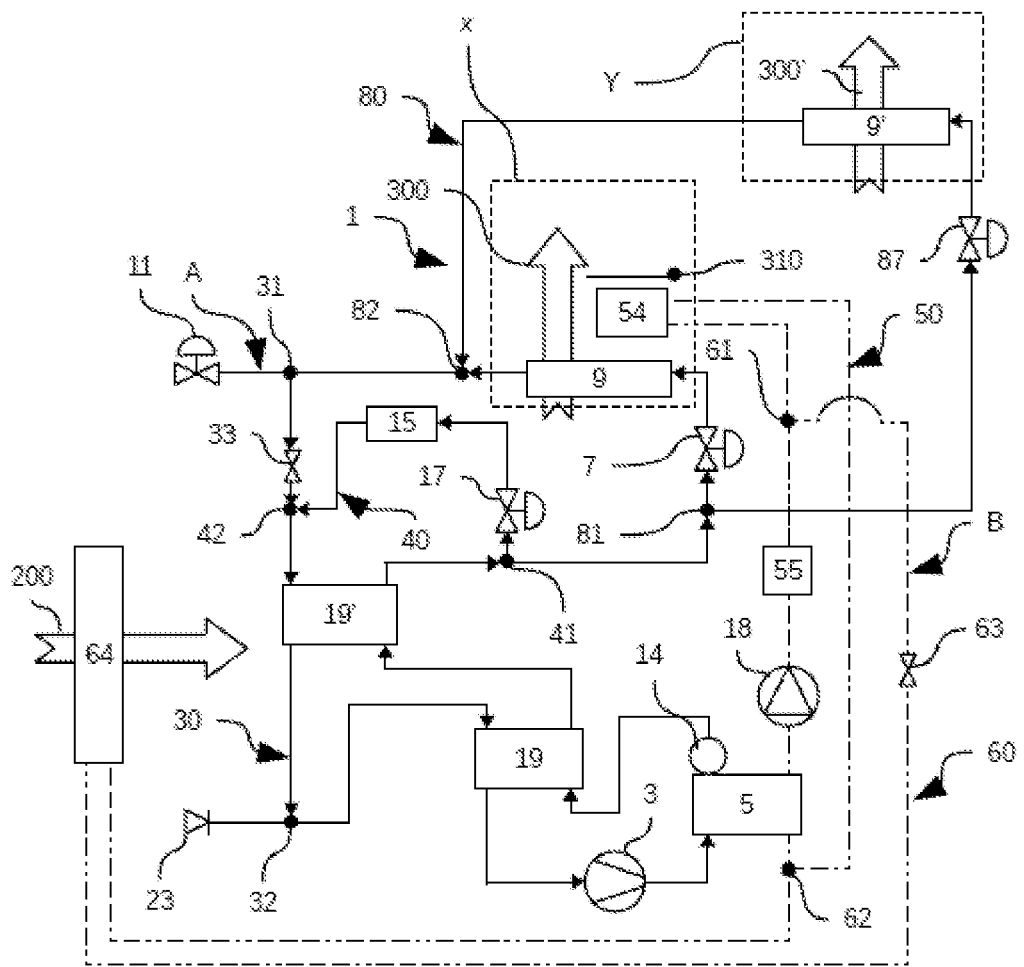

FIG. 3 is a schematic depiction of an indirect reversible air-conditioning circuit according to a third embodiment, FIG. 4 is a schematic depiction of an indirect reversible air-conditioning circuit according to a fourth embodiment, FIG. 5 is a schematic depiction of an indirect reversible air-conditioning circuit according to a fifth embodiment, FIG. 6 shows an expansion device according to an alternative embodiment, FIG. 7 is a schematic depiction of the second loop for heat-transfer fluid of the indirect reversible air-conditioning circuit of FIGS. 1 to 6, according to an alternative embodiment, FIG. 8 is a schematic depiction of an indirect reversible air-conditioning circuit according to a sixth embodiment, FIG. 9 shows the indirect reversible air-conditioning circuit of FIG. 2, in a first cooling mode, FIG. 10 shows the indirect reversible air-conditioning circuit of FIG. 2, in a second cooling mode, FIG. 11 shows the indirect reversible air-conditioning circuit of FIG. 2, in a third cooling mode, FIG. 12 shows the indirect reversible air-conditioning circuit of FIG. 2, in a fourth cooling mode, FIG. 13 shows the indirect reversible air-conditioning circuit of FIG. 2, in a fifth cooling mode, FIG. 14 shows the indirect reversible air-conditioning circuit of FIG. 2, in a sixth cooling mode.

Figure 15:
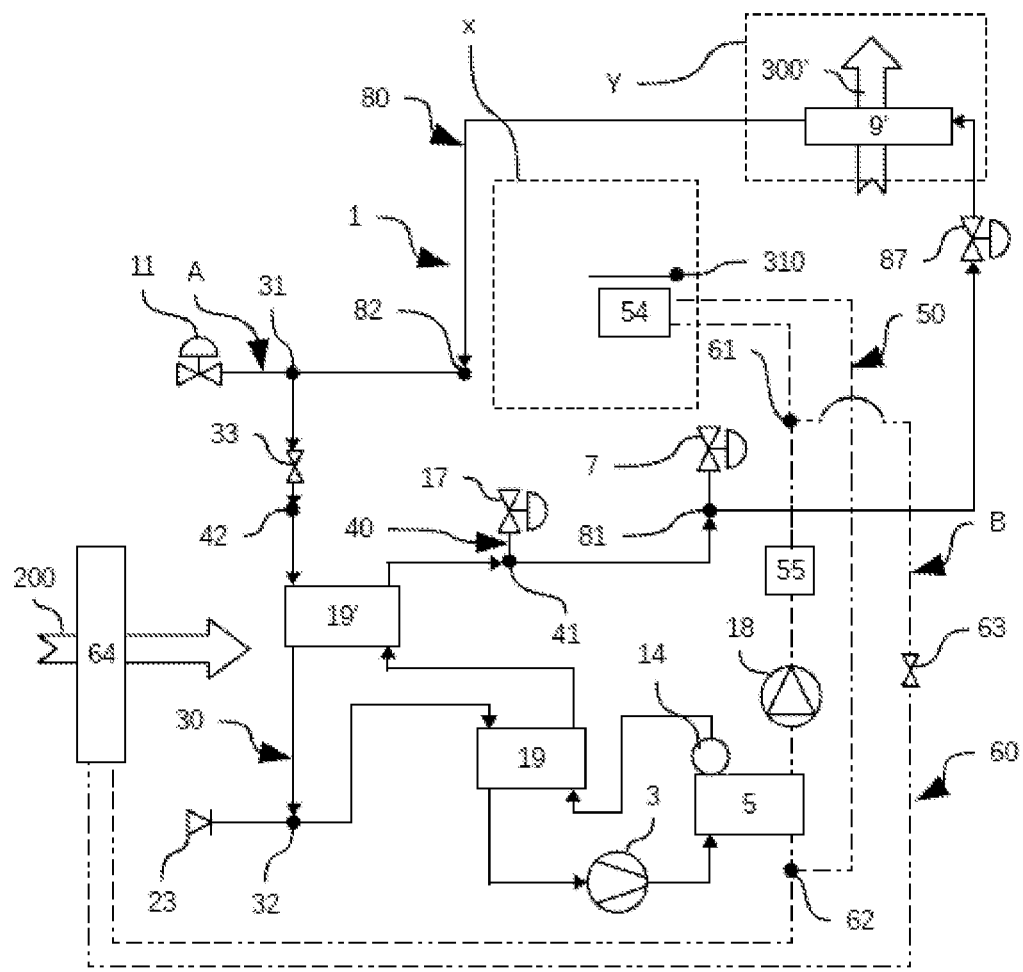

FIG. 15 shows the indirect reversible air-conditioning circuit of FIG. 2, in a seventh cooling mode.

In the various figures, identical elements bear the same reference numbers.

The following embodiments are examples. Although the description refers to one or more embodiments, this does not necessarily mean that each reference relates to the same embodiment, or that the features apply only to one embodiment. Single features of different embodiments can also be combined and/or interchanged in order to create other embodiments.

In the present description, some elements or parameters can be indexed, such as, for example, first element or second element, as well as first parameter and second parameter or even first criterion and second criterion, etc. In this case, this is simple indexing for differentiating and denoting elements or parameters or criteria that are similar but not identical. This indexing does not imply any priority of one element, parameter or criterion over another and such denominations can be easily interchanged without departing from the scope of the present description. Furthermore, this indexing does not imply any chronological order, for example, in assessing any given criterion.

In the present description, "positioned upstream" is given to mean that an element is positioned before another with respect to the direction in which a fluid circulates. Conversely, "positioned downstream" is given to mean that an element is positioned after another with respect to the direction in which the fluid circulates.

FIG. 1 shows a thermal management device comprising an indirect air-conditioning circuit 1 for a motor vehicle. This indirect air-conditioning circuit 1 notably comprises:

a first loop for refrigerant fluid A, in which a refrigerant fluid circulates, a second loop for heat-transfer fluid B, in which a heat-transfer fluid circulates, and a two-fluid heat exchanger 5 arranged jointly on the first loop for refrigerant fluid A, and on the second loop for heat-transfer fluid B, so as to allow exchanges of heat between said first loop for refrigerant fluid A and said second loop for heat-transfer fluid B.

The first loop for refrigerant fluid A comprises, more particularly in the direction in which the refrigerant fluid circulates:

a compressor 3, the two-fluid heat exchanger 5, positioned downstream of said compressor 3, a first expansion device 7.

a first heat exchanger 9 intended to have passing through it a first flow 300 of air internal to the motor vehicle, a second expansion device 11, a second heat exchanger 13 intended to have passing through it a flow 200 of air external to the motor vehicle, and a first bypass pipe 30 bypassing the second heat exchanger 13.

What is meant here by a first internal-air flow 300 is a flow of air intended for the interior compartment of the motor vehicle. The first heat exchanger 9 is thus arranged in a first heating, ventilation and air-conditioning device X. What is meant by an external-air flow 200 is a flow of air coming from outside the motor vehicle. The second heat exchanger 13 may thus be arranged on the front face of the motor vehicle.

The first bypass pipe 30 may more specifically connect a first connection point 31 and a second connection point 32.

The first connection point 31 is preferably positioned, in the direction in which the refrigerant fluid circulates, downstream of the first heat exchanger 9, between said first heat exchanger 9 and the second heat exchanger 13. More particularly, and as illustrated in FIG. 1, the first connection point 31 is positioned between the first heat exchanger 9 and the second expansion device 11. However, it is entirely possible to conceive of the first connection point 31 being positioned between the second expansion device 11 and the second heat exchanger 13 provided that the refrigerant fluid has the possibility to bypass said second expansion device 11 or to pass through same without experiencing a pressure drop.

The second connection point 32 is itself preferably positioned downstream of the second heat exchanger 13, between said heat exchanger 13 and the compressor 3.

In order to control whether or not the refrigerant fluid passes within the first bypass pipe 30, the latter comprises a first shut-off valve 33. In order for the refrigerant fluid not to pass through the second heat exchanger 13, the second expansion device 11 may notably comprise a shut-off function, namely is able to block the flow of refrigerant fluid when closed. An alternative may be to position a shut-off valve between the second expansion device 11 and the first connection point 31.

Another alternative (not depicted) may also be to fit a three-way valve at the first connection point 31.

The first loop for refrigerant fluid A may also comprise a nonreturn valve 23 positioned downstream of the second heat exchanger 13, between said second heat exchanger 13 and the second connection point 32 in order to prevent any reflux of refrigerant fluid coming from the first bypass pipe 30 towards the second heat exchanger 13.

What is meant here by a shut-off valve, a nonreturn valve, a three-way valve or an expansion device with shut-off function, are mechanical or electromechanical elements which can be operated by an electronic control unit carried on board the motor vehicle.

The first loop for refrigerant fluid A also comprises a first internal heat exchanger 19 (or IHX) allowing an exchange of heat between the high-pressure refrigerant fluid leaving the two-fluid heat exchanger 5 and the low-pressure refrigerant fluid leaving the second heat exchanger 13 or leaving the first bypass pipe 30. This first internal heat exchanger 19 notably comprises an inlet and an outlet for low-pressure refrigerant fluid coming from the second connection point 32, and an inlet and an outlet for high-pressure refrigerant fluid coming from the two-fluid heat exchanger 5.

What is meant by high-pressure refrigerant fluid is a refrigerant fluid that has undergone an increase in pressure at the compressor 3 and which has not yet experienced a pressure drop as a result of one of the expansion devices. What is meant by low-pressure refrigerant fluid is a refrigerant fluid that has experienced a pressure drop and is at a pressure close to the pressure at the inlet of the compressor 3.

The first loop for refrigerant fluid A also comprises a second internal heat exchanger (IHX) 19' allowing an exchange of heat between the high-pressure refrigerant fluid leaving the first internal heat exchanger 19 and the low-pressure refrigerant fluid circulating in the first bypass pipe 30. This second internal heat exchanger 19' notably comprises an inlet and an outlet for low-pressure refrigerant fluid coming from the first connection point 31, and an inlet and an outlet for high-pressure refrigerant fluid coming from the first internal heat exchanger 19. As illustrated in FIG. 1, the low-pressure side of the second internal heat exchanger 19' may be positioned downstream of the first shut-off valve 33.

Of the first 19 and second 19' internal heat exchangers, at least one may be a coaxial heat exchanger, which means to say one comprising two tubes that are coaxial and between which the exchanges of heat take place.

For preference, the first internal heat exchanger 19 may be a coaxial internal heat exchanger with a length comprised between 50 and 120 mm, whereas the second internal heat exchanger 19' may be a coaxial internal heat exchanger with a length comprised between 200 and 700 mm.

The first loop for refrigerant fluid A may also comprise a bottle of desiccant 14 positioned downstream of the two-fluid heat exchanger 5, more specifically between said two-fluid heat exchanger 5 and the first internal heat exchanger 19. Such a bottle of desiccant 14 placed on the high-pressure side of the air-conditioning circuit, namely downstream of the two-fluid heat exchanger 5 and upstream of an expansion device, represents less bulk and a lower cost by comparison with other phase-separation solutions such as an accumulator which would be positioned on the low-pressure side of the air-conditioning circuit, namely upstream of the compressor 3, notably upstream of the first internal heat exchanger 19.

The first 7 and second 11 expansion devices may be electronic expansion valves, namely expansion valves the outlet refrigerant-fluid pressure of which is controlled by an actuator which fixes the open cross section of the expansion device, thus fixing the pressure of the fluid at outlet. Such an electronic expansion valve is notably able to allow the refrigerant fluid to pass without a pressure drop when said expansion device is fully open.

According to one preferred embodiment, the first expansion device 7 is an electronic expansion valve that can be controlled by a control unit incorporated into the vehicle, and the second expansion device 11 is a thermostatic expansion valve.

The second expansion device 11 may notably be a thermostatic expansion valve incorporating a shut-off function. In that case, said first 7 and second 11 expansion devices may be bypassed by a diversion pipe A', notably comprising a shut-off valve 25, as illustrated in FIG. 6. This diversion pipe A' allows the refrigerant fluid to bypass said first 7 and second 11 expansion devices without experiencing a drop in pressure. For preference, at least the second expansion device 11 is a thermostatic expansion valve comprising a diversion pipe A'. The first expansion device 7 may also comprise a shut-off function or else comprise a shut-off valve downstream of it so as to block or not block the passage of the refrigerant fluid.

The first loop for refrigerant fluid A also includes a second bypass pipe 40 bypassing the first expansion device 7 and the first heat exchanger 9. This second bypass pipe 40 comprises a third expansion device 17 positioned upstream of a first cooler 15. This first cooler 15 may be arranged jointly on a secondary thermal management loop. The secondary thermal management loop may more particularly be a loop through which there circulates a heat-transfer fluid and which is connected to heat exchangers or cold plates in the region of batteries and/or electronic elements.

The first cooler 15 may also be a heat exchanger directly in contact with the elements, such as the batteries, that are to be cooled.

The third expansion device 17 may also comprise a shut-off function so as to allow or not allow the refrigerant fluid to pass through the second bypass pipe 40. An alternative is to position a shut-off valve on the second bypass pipe 40, upstream of the third expansion device 17.

The second bypass pipe 40 is connected on the one hand upstream of the first expansion device 7. This connection is achieved at a third connection point 41 positioned upstream of the first expansion device 7, between the second heat exchanger 19' and said first expansion device 7.

According to a first embodiment illustrated in FIG. 1, the second bypass pipe 40 is connected, on the other hand, to the first bypass pipe 30, upstream of the first shut-off valve 33 and of the second internal heat exchanger 19'. This connection is achieved at a fourth connection point 42 positioned between the first connection point 31 and the first shut-off valve 33 when the latter is positioned upstream of the second internal heat exchanger 19' as in FIG. 1.

According to a second embodiment illustrated in FIG. 2, the second bypass pipe 40 is connected, on the other hand, to the first bypass pipe 30, upstream of the second heat exchanger 19' and downstream of the first shut-off valve 33. The fourth connection point 42 is then positioned between the first shut-off valve 33 and the second heat exchanger 19' when the first shut-off valve 33 is positioned upstream of the second internal heat exchanger 19' as in FIG. 2.

FIG. 3 shows a third embodiment in which the second bypass pipe 40 is connected, on the one hand, upstream of the first expansion device 7 and, on the other hand, downstream of the second expansion device 19', between said second expansion device 19' and the first internal heat exchanger 19. The third connection point 41 is thus also positioned upstream of the first expansion device 7, between the second heat exchanger 19' and said first expansion device 7.

In the example of FIG. 3, the fourth connection point 42 is positioned downstream of the first bypass pipe 30, between the second connection point 32 and the first internal heat exchanger 19. However, it is entirely also possible to conceive of the fourth connection point 42 being positioned on the first bypass pipe 30, downstream of the first shut-off valve 33 and of the second internal heat exchanger 19'.

The first loop for refrigerant fluid also includes a third bypass pipe 80 bypassing the first heat exchanger 9. This third bypass pipe 80 notably comprises a first additional heat exchanger 9' arranged in a second heating, ventilation and air-conditioning device Y. This second heating, ventilation and air-conditioning device Y may, for example, be arranged within the motor vehicle for the purposes of generating a second internal-air flow 300' intended for the rear seats.

According to a first embodiment illustrated in FIGS. 1 to 3, the third bypass pipe 80 connects a fifth connection point 81 to a sixth connection point 82. The fifth connection point 81 is arranged downstream of the first expansion device 7, between said first expansion device 7 and the first heat exchanger 9. The sixth connection point 82 is itself positioned downstream of the first heat exchanger 9, between said first heat exchanger 9 and the first bypass pipe 30. This first embodiment allows the pressure of the refrigerant fluid heading toward the first heat exchanger 9 and/or toward the first additional heat exchanger 9' to be controlled using just one expansion device, in this instance the first expansion device 7. It is thus possible to use just one expansion device, thereby reducing the cost of manufacture and also making it possible to simplify the control of the thermal management device.

Still according to this first embodiment, the third bypass pipe 80 may also comprise a shut-off valve 83 so as to control whether or not the refrigerant fluid circulates in the third bypass pipe 80.

According to a second embodiment illustrated in FIG. 4, the third bypass pipe 80 connects a fifth connection point 81 to a sixth connection point 82. The fifth connection point 81 is positioned upstream of the first expansion device 7, between the second bypass pipe 40 and said first expansion device 7. The sixth connection point 82 is itself positioned downstream of the first heat exchanger 9, between said first heat exchanger 9 and the first bypass pipe 30. The third bypass pipe 80 comprises a fourth expansion device 87 arranged upstream of the first additional heat exchanger 9'. The fourth expansion device 87 may be a thermostatic expansion valve (which may or may not have a shut-off function), the thermostatic sensing bulb of which is positioned at the outlet of the first additional heat exchanger 9'. The fourth expansion device 87 may equally be an electronic expansion valve controlled, for example, by an electronic control unit.

This second embodiment allows the pressure of the refrigerant fluid heading toward the first heat exchanger 9 and toward the first additional heat exchanger 9' to be controlled independently.

As illustrated in FIG. 5, the first loop for refrigerant fluid A also comprises a fourth bypass pipe 100. This fourth bypass pipe 100 comprises a fifth expansion device 107 arranged upstream of a fifth heat exchanger 105. This fifth heat exchanger 105 may be likewise arranged jointly on a secondary thermal management loop. The secondary thermal management loop may more particularly be a loop through which there circulates a heat-transfer fluid and which is connected to heat exchangers or cold plates in the region of batteries and/or electronic elements. The fifth heat exchanger 105 may also be a heat exchanger directly in contact with the elements, such as the batteries, that are to be cooled.

The fifth expansion device 107 may also comprise a shut-off function so as to allow or not allow the refrigerant fluid to pass through the fourth bypass pipe 100. An alternative is to position a shut-off valve on the fourth bypass pipe 100, upstream of the fifth expansion device 107. The fifth expansion device 107 may be a thermostatic expansion valve, the thermostatic sensing bulb of which is positioned at the outlet of the fifth heat exchanger 105. The fifth expansion device 107 may equally be an electronic expansion valve controlled by an electronic control unit.

The fourth bypass pipe 100 is connected on the one hand upstream of the first expansion device 7. This connection is achieved at a seventh connection point 101 positioned upstream of the first expansion device 7, between the first connection point 31 of the first bypass pipe 30 and said first expansion device 7. The fourth bypass pipe 100 is connected on the other hand downstream of the second heat exchanger 13. This connection is achieved at a seventh connection point 102 positioned downstream of the second heat exchanger 13, between said second heat exchanger 13 and the second connection point 32 of the first bypass pipe 30, more specifically downstream of the nonreturn valve 23.

Still as shown in FIG. 5, the first loop for refrigerant fluid A may comprise the fifth circulation pipe 110 connecting a ninth connection point 111 to a tenth connection point 112. The ninth connection point 111 is positioned downstream of the two-fluid heat exchanger 5, between said two-fluid heat exchanger 5 and the first internal heat exchanger 19. The tenth connection point 112 is itself positioned upstream of the first internal heat exchanger 19, between said first internal heat exchanger 19 and the ninth connection point 111.

The fifth circulation pipe 110 comprises a sixth heat exchanger 114. This sixth heat exchanger 114 is intended to have the external-air flow 200 passing through it. The sixth heat exchanger 114 may notably be positioned on the front face of the motor vehicle, upstream of the second heat exchanger 13.

The indirect air-conditioning circuit 1, and, more specifically, the first loop for refrigerant fluid A, comprises a device for redirecting the refrigerant fluid leaving the two-fluid heat exchanger 5 directly toward the first internal heat exchanger 19 and/or toward the fifth circulation pipe 110.

According to a first variant illustrated in FIG. 5, the device for redirecting the refrigerant fluid leaving the two-fluid heat exchanger 5 may comprise:
 a first shut-off valve 112a arranged on the main loop A downstream of the ninth connection point 111, between the ninth connection point 111 and the tenth connection point 112, and
 a second shut-off valve 112b arranged on the fifth circulation pipe 110 downstream of the ninth connection point 111, between the ninth connection point 111 and the sixth heat exchanger 114.

According to a second variant which has not been depicted, the device for redirecting the refrigerant fluid leaving the two-fluid heat exchanger 5 comprises a three-way valve arranged at the ninth connection point 111.

The fifth circulation pipe 110 may also comprise a non-return valve 113 arranged downstream of the sixth heat exchanger 114, between said sixth heat exchanger 114 and the tenth connection point 112. This nonreturn valve 113 is positioned so as to block the refrigerant fluid coming from the tenth connection point 112.

The second loop for heat-transfer fluid B may itself comprise:
 the two-fluid heat exchanger 5.
 a first heat-transfer fluid circulation pipe 50 comprising a third heat exchanger 54 intended to have passing through it a first flow 300 of air internal to the motor vehicle, and connecting a first junction point 61 positioned downstream of the two-fluid heat exchanger 5 and a second junction point 62 positioned upstream of the two-fluid heat exchanger 5,
 a second heat-transfer fluid circulation pipe 60 comprising a fourth heat exchanger 64 intended to have passing through it a flow 200 of air external to the motor vehicle, and connecting the first junction point 61 positioned downstream of the two-fluid heat exchanger 5 and the second junction point 62 positioned upstream of the two-fluid heat exchanger 5, and
 a pump 18 positioned downstream or upstream of the two-fluid heat exchanger 5, between the first junction point 61 and the second junction point 62.

The indirect reversible air-conditioning circuit 1 comprises, within the second loop for heat-transfer fluid B, a device for redirecting the heat-transfer fluid coming from the two-fluid heat exchanger 5 toward the first circulation pipe 50 and/or toward the second circulation pipe 60.

As illustrated in FIGS. 1 to 5, said device for redirecting the heat-transfer fluid coming from the two-fluid heat exchanger 5 may notably comprise a fourth shut-off valve 63 positioned on the second circulation pipe 60 so as to block or not block the heat-transfer fluid and prevent it from circulating in said second circulation pipe 60.

The thermal management device may also comprise, within the first heating, ventilation and air-conditioning device X, a flap 310 for obstructing the first internal-air flow 300 passing through the third heat exchanger 54.

This embodiment notably makes it possible to limit the number of valves in the second loop for heat-transfer fluid B, thus making it possible to limit production costs.

According to one alternative embodiment illustrated in FIG. 7, the device for redirecting the heat-transfer fluid coming from the two-fluid heat exchanger 5 may notably comprise:
 a fourth shut-off valve 63 positioned on the second circulation pipe 60 in order to block or not block the heat-transfer fluid and prevent it from circulating in said second circulation pipe 60 (and therefore through the fourth heat exchanger 64), and
 a fifth shut-off valve 53 positioned on the first circulation pipe 50 in order to block or not block the heat-transfer fluid and prevent it from circulating in said first circulation pipe 50 (and therefore through the third heat exchanger 54).

The second loop for heat-transfer fluid B may also comprise an electric heating element 55 for heating the heat-transfer fluid. Said electric heating element 55 is notably positioned, in the direction in which the heat-transfer fluid circulates, downstream of the two-fluid heat exchanger 5, between said two-fluid heat exchanger 5 and the first junction point 61.

According to an alternative embodiment illustrated in FIG. 8, the second loop for heat-transfer fluid B may also comprise a third heat-transfer fluid circulation pipe 90 comprising a second additional heat exchanger 54' arranged in the second heating, ventilation and air-conditioning device Y. This third circulation pipe 90 connects a third junction point 91 to a fourth junction point 92. The third junction point 91 is arranged downstream of the first junction point 61, between said first junction point 61 and the third heat exchanger 54. The fourth junction point 92 is itself positioned downstream of the third heat exchanger 54, between said third heat exchanger 54 and the second junction point 62. This second additional heat exchanger 54' notably allows the heating or the dehumidifying of the second internal-air flow 100'.

The present invention also relates to various modes of operation, illustrated in FIGS. 9 to 15, for operating the indirect reversible air-conditioning circuit 1. In these FIGS. 9 to 15, only the elements through which the refrigerant fluid and/or the heat-transfer fluid circulate(s) have been depicted. The direction of circulation of the refrigerant fluid and/or the heat-transfer fluid is indicated using arrows.

1. First Cooling Mode:

FIG. 9 shows a first cooling mode in which the first loop for refrigerant fluid A is according to the first embodiment as illustrated in FIG. 2. The refrigerant fluid circulates in succession through:
 the compressor 3, where the refrigerant fluid transitions to a high pressure.
 the two-fluid heat exchanger 5, in which the refrigerant fluid gives up heat energy to the heat-transfer fluid of the second loop for heat-transfer fluid B.
 the first internal heat exchanger 19,
 the second internal heat exchanger 19', the first expansion device 7, in which the refrigerant fluid experiences a pressure drop, and transitions to a low pressure.

the first heat exchanger 9, in which the refrigerant fluid absorbs heat energy from the first internal-air flow 300, cooling same, the first bypass pipe 30, the low-pressure refrigerant fluid then enters the second internal heat exchanger 19'.

the first internal heat exchanger 19, before returning to the compressor 3.

In the second loop for heat-transfer fluid B, the heat-transfer fluid leaving the two-fluid heat exchanger 5 circulates through the fourth heat exchanger 64 of the second circulation pipe 60.

As illustrated in FIG. 9, a proportion of the heat-transfer fluid leaving the two-fluid heat exchanger 5 circulates through the third heat exchanger 54 of the first circulation pipe 50 and another proportion of the heat-transfer fluid leaving the two-fluid heat exchanger 5 circulates through the fourth heat exchanger 64 of the second circulation pipe 50. The blanking flap 310 is closed to prevent the first internal-air flow 300 from circulating through the third heat exchanger 54.

The refrigerant fluid entering the compressor 3 is in the gaseous phase. The refrigerant fluid undergoes a compression as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of this heat energy to the heat-transfer fluid of the second loop for heat-transfer fluid B. The high-pressure refrigerant fluid therefore loses heat energy while remaining at a constant pressure.

The high-pressure refrigerant fluid then enters the first internal heat exchanger 19 where it loses heat energy. This heat energy is transferred to the low-pressure refrigerant fluid coming from the first bypass pipe 30.

The high-pressure refrigerant fluid then enters the second internal heat exchanger 19' where it once again loses heat energy. This heat energy is transferred to the low-pressure refrigerant fluid passing through the first bypass pipe 30.

On leaving the second internal heat exchanger 19', the high-pressure refrigerant fluid enters the first expansion device 7. The high-pressure refrigerant fluid experiences an isenthalpic pressure drop and transitions to a state of a biphasic mixture. The refrigerant fluid is now said to be at low pressure.

The refrigerant fluid does not pass through the second bypass pipe 40 because the third expansion device 17 is closed. The refrigerant fluid does not pass through the third bypass pipe 80 because the shut-off valve 83 is closed.

The low-pressure refrigerant fluid then passes through the first heat exchanger 9 where it gains heat energy while cooling the first internal-air flow 300. The refrigerant fluid transitions back to the gaseous state. On leaving the first heat exchanger 9, the refrigerant fluid is redirected toward the first bypass pipe 30 because the first shut-off valve 33 is open. In order that the refrigerant fluid does not enter the second heat exchanger 13, the second expansion device 11 is closed.

The low-pressure refrigerant fluid then enters the second internal heat exchanger 19' where it gains heat energy coming from the high-pressure refrigerant fluid passing through the second internal heat exchanger 19'.

The low-pressure refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3.

This first cooling mode is useful for cooling the first internal-air flow 300.

In this first cooling mode, the two internal heat exchangers 19 and 19' are active and their effects combine. The use of the internal heat exchangers 19 and 19' one after the other makes it possible to lower the heat energy of the refrigerant fluid entering the first expansion device 7. The refrigerant fluid in the liquid state leaving the two-fluid heat exchanger 5 is cooled by the refrigerant fluid in the gaseous state and at low pressure leaving the first heat exchanger 9. The difference in heat energy across the terminals of this heat exchanger increases appreciably, allowing both an increase in the cooling power available at the first heat exchanger 9, this in turn thus improving the coefficient of performance (COP).

In addition, the addition of heat energy to the low-pressure refrigerant fluid at the first 19 and second 19' internal heat exchangers makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5.

In the second loop for heat-transfer fluid B, the heat-transfer fluid gains heat energy coming from the refrigerant fluid at the two-fluid heat exchanger 5.

As illustrated in the example of FIG. 9, a proportion of the heat-transfer fluid circulates in the first circulation pipe 50 and passes through the third heat exchanger 54. The heat-transfer fluid does not, however, lose heat energy because the blanking flap 310 is closed again and blocks off the first internal-air flow 300 so that it does not pass through the third heat exchanger 54.

Another proportion of the heat-transfer fluid circulates in the second circulation pipe 60 and passes through the fourth heat exchanger 64. The heat-transfer fluid loses heat energy at said fourth heat exchanger 64, releasing it into the external-air flow 200. The fourth shut-off valve 63 is open so as to allow the heat-transfer fluid to pass.

An alternative solution (not depicted) for stopping the heat-transfer fluid from exchanging with the first internal-air flow 300 at the third heat exchanger 54 is to equip the first circulation pipe 50 with the fifth shut-off valve 53 as in FIG. 7 and to close this valve so as to prevent the heat-transfer fluid from circulating in said first circulation pipe 50.

2. Second Cooling Mode:

FIG. 10 shows a second cooling mode. This second cooling mode is identical to the first cooling mode of FIG. 9, except that on leaving the first expansion device 7, a first part of the refrigerant fluid at low pressure passes through the first heat exchanger 9, and a second part of the refrigerant fluid passes into the third bypass pipe 80. For that, the shut-off valve 83 of the third bypass pipe 80 is opened. The low-pressure refrigerant fluid passes through the first additional heat exchanger 9' and gains heat energy while cooling the second internal-air flow 300'. The refrigerant fluid transitions back to the gaseous state. The two parts of the refrigerant fluid come back together again upstream of the first bypass pipe 30.

This second cooling mode allows the first internal-air flow 300 to be cooled via the first heat exchanger 9 within the first heating, ventilation and air-conditioning device X, and allows the second internal-air flow 300' to be cooled via the first additional heat exchanger 9' within the second heating, ventilation and air-conditioning device Y.

3. Third Cooling Mode:

FIG. 11 shows a third cooling mode. This third cooling mode is identical to the second cooling mode of FIG. 10, except that on leaving the second internal heat exchanger 19', a first part of the refrigerant fluid at high pressure is redirected toward the first expansion device 7, and a second part of the refrigerant fluid at high pressure is redirected into the second bypass pipe 40. This second part of the refrigerant fluid at high pressure passes through the third expansion device 17 and experiences an isenthalpic pressure drop and transitions to a state of a biphasic mixture. The refrigerant fluid is now said to be at low pressure. The low-pressure refrigerant fluid then passes through the first cooler 15 where it gains heat energy while cooling elements such as the batteries. The refrigerant fluid transitions back to the gaseous state.

The two parts of the refrigerant fluid come back together again at the first bypass pipe 30.

This third cooling mode allows the first internal-air flow 300 to be cooled via the first heat exchanger 9 within the first heating, ventilation and air-conditioning device X, and allows the second internal-air flow 300' to be cooled via the first additional heat exchanger 9' within the second heating, ventilation and air-conditioning device Y. It also allows elements such as the batteries to be cooled via the first cooler 15.

An alternative, not depicted, to this third cooling mode is for the refrigerant fluid not to enter the third bypass pipe 80. In this alternative, only the internal-air flow 300 and the elements such as the batteries are cooled.

4. Fourth Cooling Mode:

FIG. 12 shows a fourth cooling mode in which the first loop for refrigerant fluid A is according to the second embodiment as illustrated in FIG. 4. The refrigerant fluid circulates in succession through:
- the compressor 3, where the refrigerant fluid transitions to a high pressure,
- the two-fluid heat exchanger 5, in which the refrigerant fluid gives up heat energy to the heat-transfer fluid of the second loop for heat-transfer fluid B,
- the first internal heat exchanger 19,
- the second internal heat exchanger 19',
- the first expansion device 7, in which the refrigerant fluid experiences a pressure drop, and transitions to a low pressure,
- the first heat exchanger 9, in which the refrigerant fluid absorbs heat energy from the first internal-air flow 300, cooling same,
- the first bypass pipe 30,
- the low-pressure refrigerant fluid then enters the second internal heat exchanger 19',
- the first internal heat exchanger 19, before returning to the compressor 3.

In the second loop for heat-transfer fluid B, the heat-transfer fluid leaving the two-fluid heat exchanger 5 circulates through the fourth heat exchanger 64 of the second circulation pipe 60.

As illustrated in FIG. 12, a proportion of the heat-transfer fluid leaving the two-fluid heat exchanger 5 circulates through the third heat exchanger 54 of the first circulation pipe 50 and another proportion of the heat-transfer fluid leaving the two-fluid heat exchanger 5 circulates through the fourth heat exchanger 64 of the second circulation pipe 60.

The blanking flap 310 is closed to prevent the first internal-air flow 300 from circulating through the third heat exchanger 54.

The refrigerant fluid entering the compressor 3 is in the gaseous phase. The refrigerant fluid undergoes a compression as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of this heat energy to the heat-transfer fluid of the second loop for heat-transfer fluid B. The high-pressure refrigerant fluid therefore loses heat energy while remaining at a constant pressure.

The high-pressure refrigerant fluid then enters the first internal heat exchanger 19 where it loses heat energy. This heat energy is transferred to the low-pressure refrigerant fluid coming from the first bypass pipe 30.

The high-pressure refrigerant fluid then enters the second internal heat exchanger 19' where it once again loses heat energy. This heat energy is transferred to the low-pressure refrigerant fluid passing through the first bypass pipe 30.

On leaving the second internal heat exchanger 19', the refrigerant fluid does not enter the second bypass pipe 40 because the third expansion device 17 is closed. The high-pressure refrigerant fluid enters the first expansion device 7 where it experiences an isenthalpic pressure drop and transitions to a state of a biphasic mixture. The refrigerant fluid is now said to be at low pressure. The refrigerant fluid does not pass through the third bypass pipe 80 because the fourth expansion device 87 is closed.

The low-pressure refrigerant fluid then passes through the first heat exchanger 9 where it gains heat energy while cooling the first internal-air flow 300. The refrigerant fluid transitions back to the gaseous state. On leaving the first heat exchanger 9, the refrigerant fluid is redirected toward the first bypass pipe 30 because the first shut-off valve 33 is open. In order that the refrigerant fluid does not enter the second heat exchanger 13, the second expansion device 11 is closed.

The low-pressure refrigerant fluid then enters the second internal heat exchanger 19' where it gains heat energy coming from the high-pressure refrigerant fluid passing through the second internal heat exchanger 19'.

The low-pressure refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3.

Just as in the first cooling mode, this fourth cooling mode is useful for cooling the first internal-air flow 300.

In this fourth cooling mode, the two internal heat exchangers 19 and 19' are active and their effects combine. The use of the internal heat exchangers 19 and 19' one after the other makes it possible to lower the heat energy of the refrigerant fluid entering the first expansion device 7. The refrigerant fluid in the liquid state leaving the two-fluid heat exchanger 5 is cooled by the refrigerant fluid in the gaseous state and at low pressure leaving the first heat exchanger 9. The difference in heat energy across the terminals of this heat exchanger increases appreciably, allowing both an increase in the cooling power available at the first heat exchanger 9, and an improvement to the coefficient of performance (COP).

In addition, the addition of heat energy to the low-pressure refrigerant fluid at the first 19 and second 19' internal heat exchangers makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5.

In the second loop for heat-transfer fluid B, the heat-transfer fluid gains heat energy coming from the refrigerant fluid at the two-fluid heat exchanger 5.

As illustrated in the example of FIG. 12, a proportion of the heat-transfer fluid circulates in the first circulation pipe 50 and passes through the third heat exchanger 54. The heat-transfer fluid does not, however, lose heat energy because the blanking flap 310 is closed again and blocks off the first internal-air flow 300 so that it does not pass through the third heat exchanger 54.

Another proportion of the heat-transfer fluid circulates in the second circulation pipe 60 and passes through the fourth heat exchanger 64. The heat-transfer fluid loses heat energy at said fourth heat exchanger 64, releasing it into the external-air flow 200. The fourth shut-off valve 63 is open so as to allow the heat-transfer fluid to pass.

An alternative solution (not depicted) for stopping the heat-transfer fluid from exchanging with the first internal-air flow 300 at the third heat exchanger 54 is to equip the first circulation pipe 50 with the fifth shut-off valve 53 as in FIG. 7 and to close this valve so as to prevent the heat-transfer fluid from circulating in said first circulation pipe 50.

5. Fifth Cooling Mode:

FIG. 13 shows a fifth cooling mode in which the first loop for refrigerant fluid A is according to the second embodiment as illustrated in FIG. 4. The refrigerant fluid circulates in succession through:

the compressor 3, where the refrigerant fluid transitions to a high pressure, the two-fluid heat exchanger 5, in which the refrigerant fluid gives up heat energy to the heat-transfer fluid of the second loop for heat-transfer fluid B, the first internal heat exchanger 19, the second internal heat exchanger 19'.

a first part of the refrigerant fluid enters the first expansion device 7, where the refrigerant fluid experiences a drop in pressure and transitions to a low pressure, and passes through the first heat exchanger 9, where the refrigerant fluid picks up heat energy from the first internal-air flow 300, cooling same, a second part of the refrigerant fluid enters the third bypass pipe 80, the fourth expansion device 87, where the refrigerant fluid experiences a drop in pressure and transitions to a low pressure, and passes through the first additional heat exchanger 9', where the refrigerant fluid picks up heat energy from the second internal-air flow 300', cooling same, the first bypass pipe 30, the low-pressure refrigerant fluid then enters the second internal heat exchanger 19'.

the first internal heat exchanger 19, before returning to the compressor 3.

In the second loop for heat-transfer fluid B, the heat-transfer fluid leaving the two-fluid heat exchanger 5 circulates through the fourth heat exchanger 64 of the second circulation pipe 60.

As illustrated in FIG. 13, a proportion of the heat-transfer fluid leaving the two-fluid heat exchanger 5 circulates through the third heat exchanger 54 of the first circulation pipe 50 and another proportion of the heat-transfer fluid leaving the two-fluid heat exchanger 5 circulates through the fourth heat exchanger 64 of the second circulation pipe 60.

The blanking flap 310 is closed to prevent the first internal-air flow 300 from circulating through the third heat exchanger 54.

The refrigerant fluid entering the compressor 3 is in the gaseous phase. The refrigerant fluid undergoes a compression as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of this heat energy to the heat-transfer fluid of the second loop for heat-transfer fluid B. The high-pressure refrigerant fluid therefore loses heat energy while remaining at a constant pressure.

The high-pressure refrigerant fluid then enters the first internal heat exchanger 19 where it loses heat energy. This heat energy is transferred to the low-pressure refrigerant fluid coming from the first bypass pipe 30.

The high-pressure refrigerant fluid then enters the second internal heat exchanger 19' where it once again loses heat energy. This heat energy is transferred to the low-pressure refrigerant fluid passing through the first bypass pipe 30.

On leaving the second internal heat exchanger 19', the refrigerant fluid does not enter the second bypass pipe 40 because the third expansion device 17 is closed.

On leaving the second internal heat exchanger 19', a first part of the high-pressure refrigerant fluid enters the first expansion device 7 where it experiences an isenthalpic pressure drop and transitions to a state of a biphasic mixture. The refrigerant fluid is now said to be at low pressure. The low-pressure refrigerant fluid then passes through the first heat exchanger 9 where it gains heat energy while cooling the first internal-air flow 300. The refrigerant fluid transitions back to the gaseous state.

On leaving the second internal heat exchanger 19', a second part of the high-pressure refrigerant fluid enters the third bypass pipe 80. The refrigerant fluid enters the fourth expansion device 87 where it experiences an isenthalpic pressure drop and transitions to a state of a biphasic mixture.

The refrigerant fluid is now said to be at low pressure. The low-pressure refrigerant fluid then passes through the first additional heat exchanger 9' where it gains heat energy while cooling the second internal-air flow 300'. The refrigerant fluid transitions back to the gaseous state.

The two parts of the refrigerant fluid come back together again upstream of the first bypass pipe 30. The refrigerant fluid is redirected toward the first bypass pipe 30 because the first shut-off valve 33 is open. In order that the refrigerant fluid does not enter the second heat exchanger 13, the second expansion device 11 is closed.

The low-pressure refrigerant fluid then enters the second internal heat exchanger 19' where it gains heat energy coming from the high-pressure refrigerant fluid passing through the second internal heat exchanger 19'.

The low-pressure refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3.

Just as in the second cooling mode, this fifth cooling mode is useful for cooling the first internal-air flow 300 and the second internal-air flow 300'.

In this fifth cooling mode, the two internal heat exchangers 19 and 19' are active and their effects combine. The use of the internal heat exchangers 19 and 19' one after the other makes it possible to lower the heat energy of the refrigerant fluid entering the first expansion device 7. The refrigerant fluid in the liquid state leaving the two-fluid heat exchanger 5 is cooled by the refrigerant fluid in the gaseous state and at low pressure leaving the first heat exchanger 9 and the first additional heat exchanger 9'. The difference in heat energy across the terminals of these two heat exchangers increases appreciably, allowing both an increase in the cooling power available, thus improving the coefficient of performance (COP).

In addition, the addition of heat energy to the low-pressure refrigerant fluid at the first 19 and second 19' internal heat exchangers makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5.

In the second loop for heat-transfer fluid B, the heat-transfer fluid gains heat energy coming from the refrigerant fluid at the two-fluid heat exchanger 5.

As illustrated in the example of FIG. 13, a proportion of the heat-transfer fluid circulates in the first circulation pipe 50 and passes through the third heat exchanger 54. The heat-transfer fluid does not, however, lose heat energy because the blanking flap 310 is closed again and blocks off the first internal-air flow 300 so that it does not pass through the third heat exchanger 54.

Another proportion of the heat-transfer fluid circulates in the second circulation pipe 60 and passes through the fourth heat exchanger 64. The heat-transfer fluid loses heat energy at said fourth heat exchanger 64, releasing it into the external-air flow 200. The fourth shut-off valve 63 is open so as to allow the heat-transfer fluid to pass.

An alternative solution (not depicted) for stopping the heat-transfer fluid from exchanging with the first internal-air flow 300 at the third heat exchanger 54 is to equip the first circulation pipe 50 with the fifth shut-off valve 53 as in FIG. 7 and to close this valve so as to prevent the heat-transfer fluid from circulating in said first circulation pipe 50.

6. Sixth Cooling Mode:

FIG. 14 shows a sixth cooling mode. This sixth cooling mode is identical to the fifth cooling mode of FIG. 13, except that on leaving the second internal heat exchanger 19', a first part of the refrigerant fluid at high pressure is redirected toward the fifth connection point 81, and a second part of the refrigerant fluid at high pressure is redirected into the second bypass pipe 40. This second part of the refrigerant fluid at high pressure passes through the third expansion device 17 and experiences an isenthalpic pressure drop and transitions to a state of a biphasic mixture. The refrigerant fluid is now said to be at low pressure. The low-pressure refrigerant fluid then passes through the first cooler 15 where it gains heat energy while cooling elements such as the batteries. The refrigerant fluid transitions back to the gaseous state.

The two parts of the refrigerant fluid come back together again at the first bypass pipe 30.

This sixth cooling mode, in the same way as the third cooling mode, allows the first internal-air flow 300 to be cooled via the first heat exchanger 9 within the first heating, ventilation and air-conditioning device X, and allows the second internal-air flow 300' to be cooled via the first additional heat exchanger 9' within the second heating, ventilation and air-conditioning device Y. It also allows elements such as the batteries to be cooled via the first cooler 15.

An alternative, not depicted, to this sixth cooling mode is for the refrigerant fluid not to enter the third bypass pipe 80. In this alternative, only the internal-air flow 300 and the elements such as the batteries are cooled.

7. Seventh Cooling Mode:

FIG. 15 shows a seventh cooling mode in which the first loop for refrigerant fluid A is according to the second embodiment as illustrated in FIG. 4. The refrigerant fluid circulates in succession through:

the compressor 3, where the refrigerant fluid transitions to a high pressure.
the two-fluid heat exchanger 5, in which the refrigerant fluid gives up heat energy to the heat-transfer fluid of the second loop for heat-transfer fluid B.
the first internal heat exchanger 19,
the second internal heat exchanger 19',
the third bypass pipe 80, the fourth expansion device 87, in which the refrigerant fluid experiences a pressure drop, and transitions to a low pressure,
the first additional heat exchanger 9', in which the refrigerant fluid absorbs heat energy from the second internal-air flow 300', cooling same,
the first bypass pipe 30,
the low-pressure refrigerant fluid then enters the second internal heat exchanger 19'.
the first internal heat exchanger 19, before returning to the compressor 3.

In the second loop for heat-transfer fluid B, the heat-transfer fluid leaving the two-fluid heat exchanger 5 circulates through the fourth heat exchanger 64 of the second circulation pipe 60.

As illustrated in FIG. 15, a proportion of the heat-transfer fluid leaving the two-fluid heat exchanger 5 circulates through the third heat exchanger 54 of the first circulation pipe 50 and another proportion of the heat-transfer fluid leaving the two-fluid heat exchanger 5 circulates through the fourth heat exchanger 64 of the second circulation pipe 60. The blanking flap 310 is closed to prevent the first internal-air flow 300 from circulating through the third heat exchanger 54.

The refrigerant fluid entering the compressor 3 is in the gaseous phase. The refrigerant fluid undergoes a compression as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of this heat energy to the heat-transfer fluid of the second loop for heat-transfer fluid B. The high-pressure refrigerant fluid therefore loses heat energy while remaining at a constant pressure.

The high-pressure refrigerant fluid then enters the first internal heat exchanger 19 where it loses heat energy. This heat energy is transferred to the low-pressure refrigerant fluid coming from the first bypass pipe 30.

The high-pressure refrigerant fluid then enters the second internal heat exchanger 19' where it once again loses heat energy. This heat energy is transferred to the low-pressure refrigerant fluid passing through the first bypass pipe 30.

On leaving the second internal heat exchanger 19', the refrigerant fluid does not enter the first heat exchanger 9 because the first expansion device 17 is closed. The high-pressure refrigerant fluid then enters the third bypass pipe 80 and the fourth expansion device 87 where it experiences an isenthalpic pressure drop and transitions to a state of a biphasic mixture. The refrigerant fluid is now said to be at low pressure. The refrigerant fluid does not pass through the second bypass pipe 40 because the third expansion device 17 is closed.

The low-pressure refrigerant fluid then passes through the first additional heat exchanger 9' where it gains heat energy while cooling the second internal-air flow 300'. The refrigerant fluid transitions back to the gaseous state. On leaving the first additional heat exchanger 9', the refrigerant fluid is redirected toward the first bypass pipe 30 because the first shut-off valve 33 is open. In order that the refrigerant fluid does not enter the second heat exchanger 13, the second expansion device 11 is closed.

The low-pressure refrigerant fluid then enters the second internal heat exchanger 19' where it gains heat energy coming from the high-pressure refrigerant fluid passing through the second internal heat exchanger 19'.

The low-pressure refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3. This seventh cooling mode is useful for cooling the second internal-air flow 300'.

In this seventh cooling mode, the two internal heat exchangers 19 and 19' are active and their effects combine. The use of the internal heat exchangers 19 and 19' one after the other makes it possible to lower the heat energy of the refrigerant fluid entering the fourth expansion device 87. The refrigerant fluid in the liquid state leaving the two-fluid heat exchanger 5 is cooled by the refrigerant fluid in the gaseous state and at low pressure leaving the first additional heat exchanger 9'. The difference in heat energy across the terminals of this heat exchanger increases appreciably, allowing both an increase in the cooling power available at the first additional heat exchanger 9', this in turn thus improving the coefficient of performance (COP).

In addition, the addition of heat energy to the low-pressure refrigerant fluid at the first 19 and second 19' internal heat exchangers makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5.

In the second loop for heat-transfer fluid B, the heat-transfer fluid gains heat energy coming from the refrigerant fluid at the two-fluid heat exchanger 5.

As illustrated in the example of FIG. 15, a proportion of the heat-transfer fluid circulates in the first circulation pipe 50 and passes through the third heat exchanger 54. The heat-transfer fluid does not, however, lose heat energy because the blanking flap 310 is closed again and blocks off the first internal-air flow 300 so that it does not pass through the third heat exchanger 54.

Another proportion of the heat-transfer fluid circulates in the second circulation pipe 60 and passes through the fourth heat exchanger 64. The heat-transfer fluid loses heat energy at said fourth heat exchanger 64, releasing it into the external-air flow 200. The fourth shut-off valve 63 is open so as to allow the heat-transfer fluid to pass.

An alternative solution (not depicted) for stopping the heat-transfer fluid from exchanging with the first internal-air flow 300 at the third heat exchanger 54 is to equip the first circulation pipe 50 with the fifth shut-off valve 53 as in FIG. 7 and to close this valve so as to prevent the heat-transfer fluid from circulating in said first circulation pipe 50.

It is also entirely possible to conceive of an alternative seventh cooling mode (not depicted) in which, on leaving the second internal heat exchanger 19', the refrigerant fluid circulates also in the second bypass pipe 40, experiences a drop in pressure and enters the first cooler 15 in order to cool elements such as the batteries.

This seventh cooling mode is possible only because the third bypass pipe 80 comprises a fourth expansion device 87 dedicated to causing the refrigerant fluid to experience a drop in pressure upstream of the first additional heat exchanger 9'. In order for this seventh cooling mode to be possible in the first embodiment illustrated in FIGS. 1 to 3, a controllable shut-off valve would need to be added between the fifth connection point 81 and the first heat exchanger 9 in order to block the refrigerant fluid and redirect it exclusively toward the third bypass pipe 80.

Other modes of operation such as deicing, dehumidifying, heat pump, or heating modes may also be envisioned with such an architecture of the indirect reversible air-conditioning circuit 1.

Thus, it may be clearly seen that, because of its architecture and particularly because of the presence of the third bypass pipe 80, of the first additional heat exchanger 9' and of the second heating, ventilation and air-conditioning device Y, the thermal management device is able to regulate the temperature of two distinct internal-air flows and thus provide comfort that is differentiated according to predefined zones in the motor vehicle interior.

| Modes of operation | Fig: | Function: |
| --- | --- | --- |
| 1. First cooling mode | 9 | Third bypass pipe 80 according to the first embodiment. Cooling of the first internal-air flow 300 via the first heat exchanger 9. Removal of the heat energy via the fourth heat exchanger 64. |
| 2. Second cooling mode | 10 | Third bypass pipe 80 according to the first embodiment. Cooling of the first internal-air flow 300 via the first heat exchanger 9, and of the second internal-air flow 300' via the first additional heat exchanger 9'. Removal of the heat energy via the fourth heat exchanger 64. |
| 3. Third cooling mode | 11 | Third bypass pipe 80 according to the first embodiment. Cooling of the first internal-air flow 300 via the first heat exchanger 9, of the second internal-air flow 300' via the first additional heat exchanger 9', and cooling of elements such as batteries via the first cooler 15. Removal of the heat energy via the fourth heat exchanger 64. |
| 4. Fourth cooling mode | 12 | Third bypass pipe 80 according to the second embodiment. Cooling of the first internal-air flow 300 via the first heat exchanger 9. Removal of the heat energy via the fourth heat exchanger 64. |
| 5. Fifth cooling mode | 13 | Third bypass pipe 80 according to the second embodiment. Cooling of the first internal-air flow 300 via the first heat exchanger 9, and of the second internal-air flow 300' via the first additional heat exchanger 9'. Removal of the heat energy via the fourth heat exchanger 64. |
| 6. Sixth cooling mode | 14 | Third bypass pipe 80 according to the second embodiment. Cooling of the first internal-air flow 300 via the first heat exchanger 9, of the second internal-air flow 300' via the first additional heat exchanger 9', and cooling of elements such as batteries via the first cooler 15. Removal of the heat energy via the fourth heat exchanger 64. |
| 7. Seventh cooling mode | 15 | Third bypass pipe 80 according to the second embodiment. Cooling of the second internal-air flow 300' via the first additional heat exchanger 9'. Removal of the heat energy via the fourth heat exchanger 64. |

The invention claimed is:

1. A thermal management device comprising an indirect air-conditioning circuit for a motor vehicle, comprising:
a first loop for refrigerant fluid in which there circulates a refrigerant fluid, said first loop for refrigerant fluid comprising, in the direction of circulation of the refrigerant fluid, a compressor, a two-fluid heat exchanger, a first expansion device, a first heat exchanger arranged within a first heating, ventilation and air-conditioning device and through which there is configured to pass a first flow of air internal to the motor vehicle, a second expansion device, a second heat exchanger through which there is configured to pass a flow of air external to the motor vehicle;
a first bypass pipe connecting a first connection point arranged downstream of the first heat exchanger, between said first heat exchanger and the second heat exchanger, to a second connection point arranged downstream of the second heat exchanger, between said second heat exchanger and the compressor,
said first bypass pipe comprising a first shut-off valve;
a first internal heat exchanger, allowing an exchange of heat between the high-pressure refrigerant fluid leaving the two-fluid heat exchanger and the low-pressure refrigerant fluid leaving the second heat exchanger or leaving the first bypass pipe;
a second internal heat exchanger allowing an exchange of heat between the high-pressure refrigerant fluid leaving the first internal heat exchanger and the low-pressure refrigerant fluid circulating in the first bypass pipe;
a second bypass pipe connecting a third connection point arranged upstream of the first expansion device, between the compressor and said first expansion device, to a fourth connection point arranged on the first bypass pipe or upstream of the first internal heat exchanger, between the second connection point and said first internal heat exchanger, said second bypass pipe comprising a third expansion device arranged upstream of a first cooler;
a third bypass pipe, bypassing the first heat exchanger, said third bypass pipe comprising a first additional heat exchanger arranged in a second heating, ventilation and air-conditioning device; and
a second loop for heat-transfer fluid in which a heat-transfer fluid circulates,
the two-fluid heat exchanger being arranged jointly on the first loop for refrigerant fluid downstream of the compressor, between said compressor and the first expansion device, and on the second loop for heat-transfer fluid.

2. The thermal management device as claimed in claim 1, wherein the third bypass pipe connects a fifth connection point, arranged downstream of the first expansion device, between said first expansion device and the first heat exchanger, to a sixth connection point, arranged downstream of the first heat exchanger, between said first heat exchanger and the first bypass pipe.

3. The thermal management device as claimed in claim 2, wherein the third bypass pipe comprises a shut-off valve.

4. The thermal management device as claimed in claim 1, wherein the third bypass pipe connects a fifth connection point, arranged upstream of the first expansion device, between the second bypass pipe and said first expansion device, to a sixth connection point, arranged downstream of the first heat exchanger, between said first heat exchanger and the first bypass pipe, said third bypass pipe comprising a fourth expansion device arranged upstream of the first additional heat exchanger.

5. The thermal management device as claimed in claim 4, wherein the fourth expansion device is a thermostatic expansion valve, the thermostatic sensing bulb of which is positioned at the outlet of the first additional heat exchanger.

6. The thermal management device as claimed in claim 4, wherein the fourth expansion device is an electronic expansion valve controlled by an electronic control unit.

7. The thermal management device as claimed in claim 1, wherein the second loop for heat-transfer fluid comprises:
the two-fluid heat exchanger,
a first heat-transfer fluid circulation pipe comprising a third heat exchanger arranged in the first heating, ventilation and air-conditioning device and configured to have passing through it a first flow of air internal to the motor vehicle, and connecting a first junction point positioned downstream of the two-fluid heat exchanger and a second junction point positioned upstream of said two-fluid heat exchanger,
a second heat-transfer fluid circulation pipe comprising a fourth heat exchanger configured to have passing through it a flow of air external to the motor vehicle, and connecting the first junction point positioned downstream of the two-fluid heat exchanger and the second junction point positioned upstream of said two-fluid heat exchanger, and
a pump positioned downstream or upstream of the two-fluid heat exchanger, between the first junction point and the second junction point.

8. The thermal management device as claimed in claim 7, wherein the second loop for heat-transfer fluid comprises a third heat-transfer fluid circulation pipe comprising a second additional heat exchanger arranged in the second heating, ventilation and air-conditioning device and connecting a third junction point arranged downstream of the first junction point, between said first junction point and the third heat exchanger, to a fourth junction point arranged downstream of the third heat exchanger, between said third heat exchanger and the second junction point.

9. The thermal management device as claimed in claim 1, wherein the first loop for refrigerant fluid comprises a fourth circulation pipe connecting a seventh connection point, arranged upstream of the second expansion device, between the first connection point and said second expansion device, to an eighth connection point, arranged downstream of the second heat exchanger, between said second heat exchanger and the first internal heat exchanger, said fourth circulation pipe comprising a fifth expansion device arranged upstream of a fifth heat exchanger.

10. The thermal management device as claimed in claim 1, wherein the first loop for refrigerant fluid comprises a fifth circulation pipe connecting a ninth connection point, arranged downstream of the two-fluid heat exchanger, between said two-fluid heat exchanger and the first internal heat exchanger, to a tenth connection point, arranged upstream of the first internal heat exchanger, between said first internal heat exchanger and the ninth connection point, said fifth circulation pipe comprising a sixth heat exchanger configured to have a flow of external air passing through it.

* * * * *